(12) United States Patent
Ono et al.

(10) Patent No.: US 6,712,896 B2
(45) Date of Patent: Mar. 30, 2004

(54) CELLULOSE ESTER FILM, OPTICAL FILM, POLARIZING PLATE, OPTICAL COMPENSATION FILM AND LIQUID CRYSTAL DISPLAY

(75) Inventors: Kaori Ono, Hino (JP); Isamu Michihata, Hino (JP); Osamu Ishige, Hino (JP)

(73) Assignee: Konica Minolta Holdings, Inc., Tokyo (JP)

( * ) Notice: Subject to any disclaimer, the term of this patent is extended or adjusted under 35 U.S.C. 154(b) by 21 days.

(21) Appl. No.: 09/850,167

(22) Filed: May 8, 2001

(65) Prior Publication Data

US 2002/0102368 A1 Aug. 1, 2002

(30) Foreign Application Priority Data

May 26, 2000 (JP) .............. 2000-156039
Jul. 14, 2000 (JP) .............. 2000-214134

(51) Int. Cl.$^7$ .............. C08L 97/02; C08B 3/00; C08B 3/06; C08B 7/00

(52) U.S. Cl. .............. 106/163.1; 428/50; 536/63; 536/64; 536/65; 536/67; 536/68; 536/69

(58) Field of Search .............. 536/58, 59, 63, 536/64, 65, 67, 68, 69; 106/163.01; 428/50

Primary Examiner—James J. Seidleck
Assistant Examiner—Thao Tran
(74) Attorney, Agent, or Firm—Finnegan, Henderson, Farabow, Garrett & Dunner, L.L.P.

(57) ABSTRACT

A cellulose ester film comprises (a) an ultraviolet absorbent polymer having at least one of repeating units represented by formulae (1) and (2) and repeating units having ultraviolet absorbent structures represented by formulae (3), (4) and (5), (b) an ultraviolet absorbent polymer which is a copolymer of a repeating unit represented by the following formula (6), (7) or (19) with a monomer unit derived from another ethylenically unsaturated monomer, (c) an ultraviolet absorbent polymer which is a copolymer of a monomer represented by formula (8) with a monomer represented by formula (9), or (d) modified cellulose in which an ultraviolet absorbent structure bonds directly or through a spacer to a hydroxy group of cellulose or its derivative.

21 Claims, No Drawings

CELLULOSE ESTER FILM, OPTICAL FILM, POLARIZING PLATE, OPTICAL COMPENSATION FILM AND LIQUID CRYSTAL DISPLAY

FIELD OF THE INVENTION

The present invention relates to cellulose ester film, an optical film for optical use, a polarizing plate, an optical compensation film and a liquid crystal display, and particularly to an optical film such as a protective film of a polarizing plate, a phase difference film, or a viewing angle increasing film used in a liquid crystal display, various functional films such as an anti-reflective film used in a plasma display or various functional films used in an organic EL display.

BACKGROUND OF THE INVENTION

Recently, a compact note type personal computer displaying a highly precise image has been developed. Synchronizing with the development, a protective film of a polarizing plate, which is thinner and has a higher performance, has been required. Cellulose ester is widely used as material of a protective film of a polarizing plate, in view of its transparency and refractive index. However, a simple thinning of the film produces various problems.

A cellulose ester film used in a protective film of a polarizing plate contains an ultraviolet absorber, in order to protect a polarizing element or a liquid crystal from ultraviolet light. Accordingly, a simple thinning of the film cannot sufficiently shield ultraviolet light, and therefore, the ultraviolet absorber amount contained in the film need be increased.

There is a proposal regarding an ultraviolet absorber in Japanese Patent O.P.I. Publication Nos. 6-130226 and 7-11056.

It has been found that the increased amount in the film of the ultraviolet absorber proposed in these patents produces problems in that the ultraviolet absorber is adhered to peeling rollers or transporting rollers during manufacture of the film, and produces troubles or lowers production efficiency.

There is proposed, in Japanese Patent O.P.I. Publication No. 8-148430, a protective film of a polarizing plate contains an ultraviolet absorbent polymer.

However, the ultraviolet absorbent polymer proposed in this patent has poor compatibility with cellulose ester. The increased amount of the polymer provides a high haze, and the polymer is not satisfactory in its application to a liquid crystal display requiring high precision An optical compensation film is a film having optically anisotropy capable of being used in a liquid crystal display as an alternative of CRT.

A liquid crystal display has problems in viewing angle that displaying images quality lower when viewing obliquely, since it employs a liquid crystalline material having anisotropy, and its improvement has been desired.

Anisotropic materials, which are obtained by fixing orientation of a liquid crystalline compound, have been mainly used as an optical compensation film. They are ordinarily manufactured by coating a liquid crystalline compound-containing solution on a cellulose ester film. An ultraviolet absorber contained in the cellulose ester film has problems in that it bleeds out and contaminates the liquid crystalline compound, resulting in disorder of orientation of the liquid crystalline compound or haze of the film.

SUMMARY OF THE INVENTION

An object of the invention is to provide a cellulose ester film with few coating defects, excellent productivity, and excellent transparency, and to provide an optical film, a polarizing plate, an optical compensation film and a liquid crystal display each employing the film.

Another object of the invention is to provide an optical film having an excellent spectral absorption property, reduced bleed out, and an excellent weather-proof.

DETAILED DESCRIPTION OF THE INVENTION

The above problems in the invention can be solved by the following constitutions:

1. A cellulose ester film comprising (a) an ultraviolet absorbent polymer having at least one of repeating units represented by the following formulae (1) and (2) and repeating units having ultraviolet absorbent structures represented by the following formulae (3), (4) and (5), (b) an ultraviolet absorbent polymer which is a copolymer of a repeating unit represented by the following formula (6), (7) or (19) with a monomer unit derived from another ethylenically unsaturated monomer, (c) an ultraviolet absorbent polymer which is a copolymer of a monomer represented by the following formula (8) with a monomer represented by the following formula (9), or (d) modified cellulose in which an ultraviolet absorbent structure bonds directly or through a spacer to a hydroxy group of cellulose or its derivative:

formula (1)

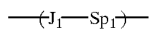

wherein $J_1$ represents —O—, —NR$_1$—, —S—, —SO—, —SO$_2$—, —POO—, —CO—, —COO—, —NR$_2$CO—, —NR$_3$COO—, —NR$_4$CONR$_5$—, —OCO—, —OCONR$_6$—, —CONR$_7$—, —NR$_8$SO—, —NR$_9$SO$_2$—, —SONR$_{10}$—, or —SO$_2$NR$_{11}$—, in which $R_1$ through $R_{11}$ independently represent a hydrogen atom, a substituted or unsubstituted alkyl group or a substituted or unsubstituted aryl group; and Sp$_1$ represents a divalent linkage which may have a halogen atom or a substituent, provided that an ultraviolet absorbent structure bonds directly or through a spacer to Sp$_1$ or forms a part of the polymer main chain, formula (2)

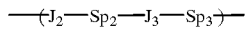

wherein $J_2$ and $J_3$ represent the same group as $J_1$ denoted in formula (1) above, and may be the same or different; Sp$_2$ and Sp$_3$ independently represent a divalent linkage which may have a halogen atom or a substituent, and may be the same or different, provided that an ultraviolet absorbent structure bonds directly or through a spacer to at least one of Sp$_2$ and Sp$_3$ or forms a part of the polymer main chain in at least one of Sp$_2$ and Sp$_3$, formula (3)

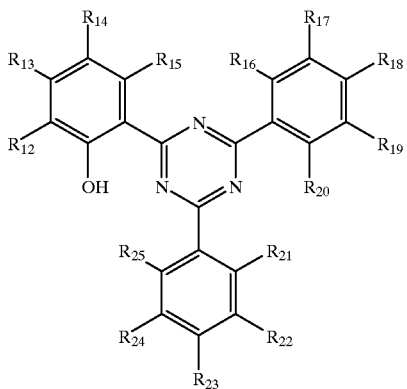

wherein $R_{12}$ through $R_{25}$ independently represent a hydrogen atom, a halogen atom or a substituent, provided that the two adjacent groups of $R_{12}$ through $R_{25}$ may combine with each other to form a ring, and provided that the ultraviolet absorbent structure of formula (3) bonds directly or through a spacer to the polymer main chain or forms a part of the polymer main chain, formula (4)

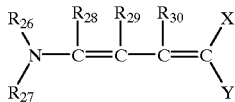

wherein $R_{26}$ and $R_{27}$ independently represent an alkyl group having a carbon atom number of 1 to 10; $R_{28}$, $R_{29}$ and $R_{30}$ independently represent a substituted or unsubstituted alkyl group, a substituted or unsubstituted alkoxy group, a substituted or unsubstituted alkylthio group or a substituted or unsubstituted amino group; X and Y independently represent an electron withdrawing group, provided that $R_{26}$ through $R_{30}$, X and Y may have a halogen atom or a substituent or may combine with another to form a 5- or 6-member ring, and provided that the ultraviolet absorbent structure of formula (4) bonds directly or through a spacer to the polymer main chain or forms a part of the polymer main chain, formula (5)

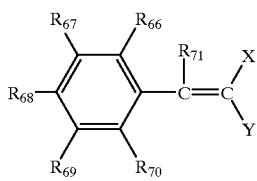

wherein $R_{66}$ through $R_{71}$ independently represent a hydrogen atom, a halogen atom or a substituent, provided that the two adjacent groups of $R_{66}$ through $R_{71}$ may combine with each other to form a ring; X and Y independently represent an electron withdrawing group, provided that X and Y may have a halogen atom or a substituent but do not combine with each other to form a ring; and provided that the ultraviolet absorbent structure of formula (5) bonds directly or through a spacer to the polymer main chain or forms a part of the polymer main chain, formula (6)

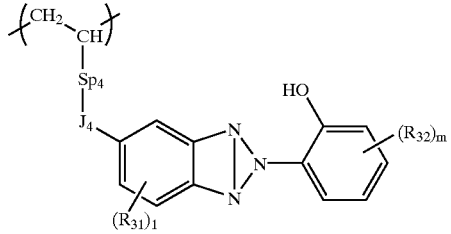

wherein $R_{31}$ and $R_{32}$ independently represent a halogen atom or a substituent; l represents 0, 1, 2, or 3, provided that when l is 2 or 3, plural $R_{31}$s may be the same or different; m represents 0, 1, 2, 3, or 4, provided that when m is 2, 3 or 4, plural $R_{32}$s may be the same or different; $J_4$ represents a group selected from *—O—, *—$NR_1$—, *—S—, *—SO—, *—$SO_2$—, *—POO—, *—CO—, *—COO—, *—$NR_2$CO—, *—$NR_3$COO—, *—$NR_4$CONR$_5$—, *—OCO—, *—OCONR$_6$—, *—CONR$_7$—, *—NR$_8$SO—, *—NR$_9$SO$_2$—, *—SONR$_{10}$—, *—SO$_2$NR$_{11}$— or *—OCOR$_{12}$—, in which symbol "*" represents that the group bonds to the ultraviolet absorbent structure at the position "*" (on the side of $J_4$ opposite $Sp_4$) and $R_1$ through $R_{12}$ independently represent the same as $R_1$ through $R_{11}$ denoted in formula (1) above; and $Sp_4$ represents a divalent linkage which may have a halogen atom or a substituent, formula (7)

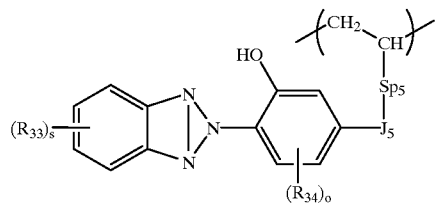

wherein $R_{33}$ and $R_{34}$ independently represent a halogen atom or a substituent; o represents 0, 1, 2 or 3, provided that when o is 2 or 3, plural $R_{34}$s may be the same or different; s represents 0, 1, 2, 3 or 4, provided that when s is 2, 3 or 4, plural $R_{33}$s are the same or different; $J_5$ represents a group selected from *—O—, *—NR$_1$—, *—S—, *—SO—, *—SO$_2$—, *—POO—, *—CO—, *—COO—, *—NR$_2$CO—, *—NR$_3$COO—, *—NR$_4$CONR$_5$—, *—OCO—, *—OCONR$_6$—, *—CONR$_7$—, *—NR$_8$SO—, *—NR$_9$SO$_2$—, *—SONR$_{10}$—, *—SO$_2$NR$_{11}$— or *—OCOR$_{12}$—, in which symbol "*" represents that the group bonds to the ultraviolet absorbent group at the position "*" (on the side of $J_5$ opposite $Sp_5$) and $R_1$ through $R_{12}$ independently represent the same as $R_1$ through $R_{11}$ denoted in formula (1) above; and $Sp_5$ represents a divalent linkage which may have a halogen group or a substituent,

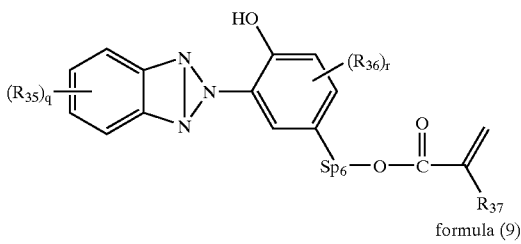

formula (8)

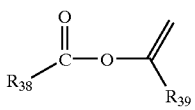

formula (9)

wherein $R_{35}$ through $R_{36}$ independently represent a halogen atom or a substituent; r represents 0, 1, 2 or 3, provided that when r is 2 or 3, plural $R_{36}$s are the same or different; q represents 0, 1, 2, 3 or 4, provided that when q is 2, 3 or 4, plural $R_{35}$s may be the same or different; $R_{37}$ through $R_{39}$ independently represent a hydrogen atom, a halogen atom or a substituent; and $Sp_6$ represents a divalent linkage which may have a halogen atom or a substituent,

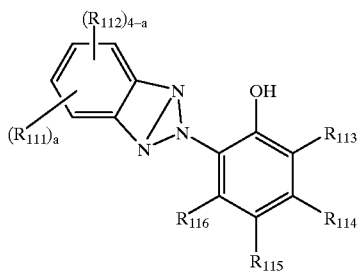

formula (19)

wherein $R_{111}$ represents a halogen atom or a substituent positioned on the benzene ring through an oxygen atom, a nitrogen atom or a sulfur atom; $R_{112}$ represents a hydrogen atom, a substituted or unsubstituted aliphatic group, a substituted or unsubstituted aromatic hydrocarbon group or a substituted or unsubstituted heterocyclic group; a represents an integer of from 1 to 4, provided that plural $R_{111}$s or plural $R_{112}$s may be the same or different; $R_{113}$, $R_{115}$, and $R_{116}$ independently represent a hydrogen atom, a substituted or unsubstituted aliphatic group, a substituted or unsubstituted aromatic hydrocarbon group or a substituted or unsubstituted heterocyclic group; $R_{114}$ represents a substituent positioned on the benzene ring through an oxygen atom or a nitrogen atom; and at least one of $R_{111}$ through $R_{116}$ has a group represented by the following formula (20),

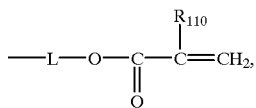

formula (20)

wherein L represents a divalent linkage or a simple bond; and $R_{110}$ represents a hydrogen atom or a substituted or unsubstituted alkyl group.

2. The cellulose ester film of item 1 above, wherein the cellulose ester film has a transmittance at 380 nm of 0 to 10%.

3. The cellulose ester film of item 1 above, wherein the cellulose ester film has a haze of 0 to 0.5.

4. The cellulose ester film of item 1 above, wherein the ultraviolet absorbent polymer is a copolymer of the repeating unit represented by formula (1), (2), (6), (7) or (19) or a repeating unit having an ultraviolet absorbent structure represented by formula (3), (4) or (5) with another ethylenically unsaturated monomer.

5. The cellulose ester film of item 4 above, wherein the ethylenically unsaturated monomer is acrylic ester comprising a hydroxy group or an ether bond or methacrylic ester comprising a hydroxy group or an ether bond.

6. The cellulose ester film of item 1 above, wherein the ultraviolet absorbent polymer is the copolymer of a repeating unit represented by formula (6) and a monomer unit derived from another ethylenically unsaturated monomer, the content of the repeating unit represented by formula (6) in the copolymer being 1 to 45% by weight.

7. The cellulose ester film of item 6 above, wherein the ethylenically unsaturated monomer is acrylic ester comprising a hydroxy group or an ether bond or methacrylic ester comprising a hydroxy group or an ether bond.

8. The cellulose ester film of item 1 above, wherein the ultraviolet absorbent polymer is the copolymer of a repeating unit represented by formula (7) and a monomer unit derived from another ethylenically unsaturated monomer, the content of the repeating unit represented by formula (7) in the copolymer being 1 to 55% by weight.

9. The cellulose ester film of item 8 above, wherein the ethylenically unsaturated monomer is acrylic ester comprising a hydroxy group or an ether bond or methacrylic ester comprising a hydroxy group or an ether bond.

10. The cellulose ester film of item 1 above, wherein the ultraviolet absorbent polymer is the copolymer of a repeating unit represented by formula (19) and a monomer unit derived from another ethylenically unsaturated monomer, the content of the repeating unit represented by formula (19) in the copolymer being 1 to 55% by weight.

11. The cellulose ester film of item 1 above, wherein the ultraviolet absorbent polymer is the copolymer of a repeating unit represented by formula (7) and a monomer unit derived from another ethylenically unsaturated monomer, and wherein in formula (7), s and o are not simultaneously zero.

12. The cellulose ester film of item 11 abovel, wherein the content of the repeating unit represented by formula (7) in the copolymer is 1 to 55% by weight.

13. The cellulose ester film of item 1 above, wherein the cellulose ester of the cellulose ester film is a lower fatty acid ester of cellulose.

14. The cellulose ester film of item 1 above, wherein the compound having an ultraviolet structure represented by formula (3), (4), or (5), or the monomer, from which the repeating unit having an ultraviolet structure represented by formula (1), (2), (6), (7), or (19) is derived, has a molar extinction coefficient at 380 nm of not less than 4000.

15. The cellulose ester film of item 1 above, wherein the compound having an ultraviolet structure represented by formula (3), (4), or (5), or the monomer, from which the repeating unit having an ultraviolet structure represented by formula (1), (2), (6), (7), or (19) is derived, has a molar extinction coefficient at 380 nm of not less than 4000, and a ratio of molar extinction coefficient at 380 nm to molar extinction coefficient at 400 nm of not less than 20.

16. The cellulose ester film of item 1 above, wherein the ultraviolet absorbent polymer has a weight average molecular weight of 2,000 to 20,000.

17. The cellulose ester film of item 1 above, wherein the cellulose ester film is a member for constituting a liquid crystal display.

18. The cellulose ester film of item 17 above, wherein the cellulose ester film is a polarizing plate protective film.

19. The cellulose ester film of item 17 above, wherein the cellulose ester film is a support for an optical compensation film.

20. The cellulose ester film of item 1 above, wherein the thickness of the cellulose ester film is 5 to 200 μm.

21. The cellulose ester film of item 20 above, wherein the thickness of the cellulose ester film is 20 to 65 μm.

22. A polarizing plate comprising a first polarizing plate protective film, a polarizing element and a second polarizing plate protective film, wherein at least one of the first polarizing plate protective film or the second polarizing plate protective film is the cellulose ester film of item 1 above.

23. The polarizing plate of item 22 above, wherein the cellulose ester film comprises an ultraviolet absorbent polymer which is a copolymer of a repeating unit represented by formula (7) and a monomer unit derived from another ethylenically unsaturated monomer, the content of the repeating unit represented by formula (7) in the copolymer being 1 to 55 weight %.

24. A liquid crystal display comprising a first polarizing plate, a second polarizing plate, and a liquid crystal cell provided between the first and second polarizing plates, the first polarizing plate being arranged on the viewer side of the display, wherein the first polarizing plate has a first film, a second film and a first polarizing film between the first and second films so that the second film is provided on the first polarizing film on the liquid crystal cell side, the second polarizing plate has a third film, a fourth film and a second polarizing film between the third and fourth films so that the third film is provided on the second polarizing film on the liquid crystal cell side, and at least one of the first, second, third and fourth films is the cellulose ester film of item 1 above.

25. The liquid crystal display of item 24 above, wherein the cellulose ester film comprises an ultraviolet absorbent polymer which is a copolymer of a repeating unit represented by formula (7) and a monomer unit derived from another ethylenically unsaturated monomer, the content of the repeating unit represented by formula (7) in the copolymer being 1 to 55 weight %.

101. A cellulose ester film containing an ultraviolet absorbent polymer, wherein the film has a transmittance at 380 nm of 0 to 10%, and a haze of 0 to 0.5.

102. A cellulose ester film comprising an ultraviolet absorbent polymer comprising a repeating unit represented by formula (1) above.

103. A cellulose ester film comprising an ultraviolet absorbent polymer comprising a repeating unit represented by formula (2) above.

104. A cellulose ester film comprising an ultraviolet absorbent polymer comprising a repeating unit having an ultraviolet absorbent structure represented by formula (3) above.

105. A cellulose ester film comprising an ultraviolet absorbent polymer comprising a repeating unit having an ultraviolet absorbent structure represented by formula (4) above.

106. A cellulose ester film comprising an ultraviolet absorbent polymer comprising a repeating unit having an ultraviolet absorbent structure represented by formula (5) above.

107. A cellulose ester film comprising an ultraviolet absorbent polymer comprising a repeating unit represented by formula (6) above.

108. A cellulose ester film containing an ultraviolet absorbent polymer comprising a repeating unit represented by formula (7) above.

109. A cellulose ester film containing a copolymer of a first monomer represented by formula (8) above and a second monomer represented by formula (9) above.

110. A cellulose ester film comprising modified cellulose in which an ultraviolet absorbent group bonds directly or through a spacer to a hydroxy group of cellulose or its derivative.

111. The cellulose ester film of any one of items 102 to 110, having a haze of 0 to 0.5.

112. The cellulose ester film of any one of items 102 to 111, having a transmittance at 380 nm of 0 to 10%.

113. An optical film comprised of the cellulose ester film of any one of items 101 to 112.

114. An optical film of item 113, wherein the cellulose ester is a lower fatty acid ester of cellulose.

115. A polarizing plate comprising a first optical film, a polarizing element and a second optical film, wherein the first optical film or the second optical film is the optical film of item 113 or 114.

116. A liquid crystal display employing the polarizing plate of item 115.

117. An optical compensation film employing as a support the cellulose ester film of any one of items 101 to 112.

118. The optical compensation film of item 117, wherein a discotic compound is contained in an optically anisotropic layer.

119. The optical compensation film of item 117, wherein a biaxial liquid crystal compound contained in an optically anisotropic layer.

120. The optical compensation film of item 117, wherein a rod-shaped liquid crystal compound is contained in an optically anisotropic layer.

201. An optical film comprising a copolymer of an ultraviolet absorbent monomer with a molar extinction coefficient at 380 nm of not less than 4000 with another ethylenically unsaturated monomer, wherein the copolymer has a weight average molecular weight of 2,000 to 20,000.

202. An optical film comprising a copolymer of an ultraviolet absorbent monomer with a molar extinction coefficient at 380 nm of not less than 4000 with another ethylenically unsaturated monomer and a ratio of molar extinction coefficient at 400 nm to molar extinction coefficient at 380 nm being not less than 20, wherein the copolymer has a weight average molecular weight of 2,000 to 20,000.

203. The optical film of item 201 or 202, wherein the ultraviolet absorbent monomer content of the copolymer is 20 to 70 weight %.

204. The optical film of any one of items 201 through 203, wherein the ultraviolet absorbent monomer is a benzotriazole type ultraviolet absorber.

205. The optical film of any one of items 201 through 204, wherein the ultraviolet absorbent monomer is a compound represented by formula (19) above.

206. The optical film of any one of items 201 through 205, wherein the ethylenically unsaturated monomer is methacrylate or acrylate each having a hydroxy group or an ether bond.

207. The optical film of any one of items 201 through 206, comprising silicon dioxide particles having an average primary order particle size of 3 to 20 nm, and an apparent gravity of 70 to 300 g/liter.

208. The optical film of any one of items 201 through 207, being a cellulose ester film.

209. The optical film of item 208, wherein the cellulose ester film is cellulose acetate propionate.

210. The optical film of any one of items 201 through 209, having a thickness of 20 to 65 μm.

211. A method of manufacturing a cellulose ester film comprising the steps of:
providing a dope containing cellulose ester and a solution containing an ultraviolet absorber;
mixing the dope with the solution in a in-line mixer to obtain a mixture solution; and
stirring the mixture solution.

212. A polarizing plate comprising a first optical film, a polarizing element and a second optical film, wherein the first optical film or the second optical film is the optical film of any one of items 201 through 210.

213. A display comprising a polarizing plate, employing the polarizing plate of item 212 above.

The present inventors have made an extensive study in order to solve the above problems occurring due to a low molecular weight ultraviolet absorbent, and as a result, they have developed an ultraviolet absorbent polymer having excellent compatibility that prevents property lowering or roller contamination due to bleed out phenomenon, does not produce lowering of an optical property or orientation disorder of an optical compensation film, and results in cost decrease. Further, the ultraviolet absorbent polymer provides excellent heat and humidity resistant properties under high humidity and high temperature condition, as well as prevention of bleed out.

Next, the present invention will be explained in detail.

The ultraviolet absorbent polymer of the invention of item 2 or 3 may be any as long as it comprises a repeating unit represented by formula (1) or (2).

In formula (1), $J_1$ represents —O—, —NR$_1$—, —S—, —SO—, —SO$_2$—, —POO—, —CO—, —COO—, —NR$_2$CO—, —NR$_3$COO—, —NR$_4$CONR$_5$—, —OCO—, —OCONR$_6$—, —CONR$_7$—, —NR$_8$SO—, —NR$_9$SO$_2$—, —SONR$_{10}$—, or —SO$_2$NR$_{11}$—, and preferably —O—, —S—, —COO—, —OCO—, —NR$_2$CO—, or —CONR$_7$—, in which $R_1$ through $R_{11}$ independently represent a hydrogen atom, an alkyl group (for example, a methyl group, an ethyl group, an isopropyl group, a hydroxyethyl group, a methoxymethyl group, a trifluoromethyl group, or a t-butyl group), or an aryl group (for example, a phenyl group, a naphthyl group, a p-tolyl group or a p-chlorophenyl group). The alkyl group or the aryl group described above may be substituted or unsubstituted.

$Sp_1$ represents a divalent linkage, and is not specifically limited. $Sp_1$ is preferably a divalent linkage comprising an alkylene group or an arylene group, and more preferably an alkylene group having a carbon atom number of 1 to 10 or an arylene group having a carbon atom number of 4 to 10. The divalent linkage may have a halogen atom or a substituent. Examples of the substituent include an alkyl group (for example, a methyl group, an ethyl group, an isopropyl group, a hydroxyethyl group, a methoxymethyl group, a trifluoromethyl group, or a t-butyl group), an aryl group (for example, a phenyl group, a naphthyl group, a p-tolyl group or a p-chlorophenyl group), an acyl group (for example, an acetyl group, a propanoyl group or a butyloyl group), a sulfonyl group (for example, a methanesulfonyl group, an ethanesulfonyl group or a phenylsulfonyl group), an alkoxy group (for example, a methoxy group, an ethoxy group, an isopropoxy group or an n-butoxy group), an aryloxy group (for example, a phenoxy group), an alkyltio group (for example, a methylthio group, an ethylthio group or an n-butylthio group), an arylthio group (for example, a phenylthio group), an amino group, an alkylamino group (for example, a methylamino group, an ethylamino group or dimethylamino group), an arylamino group (for example, a phenylamino group), an acylamino group (for example, a acetylamino group or a propionylamino group), a hydroxy group, a cyano group, a carbamoyl group (for example, a methylcarbamoyl group, an ethylcarbamoyl group or dimethylcarbamoyl group), a sulfamoyl group (for example, an ethylsulfamoyl group or dimethylsulfamoyl group), a sulfonamido group, an acyloxy group, an oxycarbonyl group, a sulfonylamino group (for example, a methanesulfonylamino group or a benzenesulfonylamino group), a ureido group (for example, a 3,3-dimethylureido group, a 1,3-dimethylureido group), a sulfamoylamino group (for example, dimethylsulfamoylamino group), an alkoxycarbonyl group (for example, a methoxycarbonyl group or an ethoxycarbonyl group), an aryloxycarbonyl group (for example, a phenoxycarbonyl group), a nitro group, an imido group (for example, a phthalimido group), and a heterocyclic group (for example, a pyridyl group, a benzimidazolyl group, a benzothiazolyl group or a benzoxazolyl group). The substituents are preferably a hydrogen atom, a halogen atom, an alkyl group, an acylamino group, a carbamoyl group, an acyloxy group or an oxycarbonyl group.

An ultraviolet absorbent group bonds directly or through a spacer to $Sp_1$ or a part or all of an ultraviolet absorbent group forms a part of $Sp_1$ in the polymer main chain.

The spacer herein referred to may be any divalent linkage group. The spacer is preferably a divalent linkage group comprising a substituted or unsubstituted alkylene group or a substituted or unsubstituted arylene group, or —O—, —NR$_{40}$—, —S—, —SO—, —SO$_2$—, —POO—, —CO—, —COO—, —NR$_{41}$CO—, —NR$_{42}$COO—, —NR$_{43}$CONR$_{44}$—, —OCO—, —OCONR$_{45}$— or —CONR$_{46}$—, and more preferably is a combination of —O—, —NR$_{40}$—, —S—, —SO—, —SO$_2$, —POO—, —CO—, —COO—, —NR$_{41}$CO—, —NR$_{42}$COO—, —NR$_{43}$CONR$_{44}$—, —OCO—, —OCONR$_{45}$— or —CONR$_{46}$— and a substituted or unsubstituted alkylene group or a substituted or unsubstituted arylene group.

$R_{40}$ through $R_{46}$ independently represent a hydrogen atom, a hydroxy group, an alkyl group, or an aryl group. The alkyl group or aryl group may have plural substituents. Examples of the substituents are the same as the substituents denoted in $Sp_1$ above of formula (1).

The ultraviolet absorbent group in the invention may be any as long as the compound having it provides an extremely high absorption at 380 nm and does not substantially absorb a visible light of not shorter than 420 nm. Examples of the ultraviolet absorbent group include groups, in which one or more hydrogen atoms are abstracted from the following compounds (10) through (18).

formula (10)

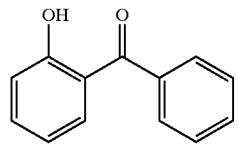

-continued

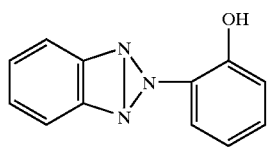
formula (11)

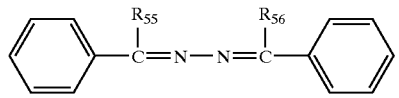
formula (12)

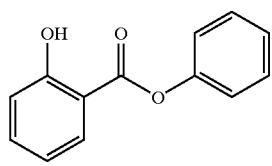
formula (13)

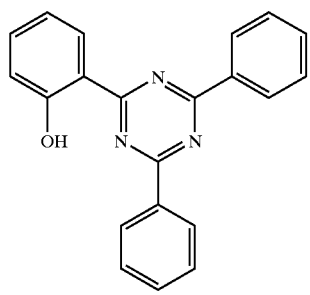
formula (14)

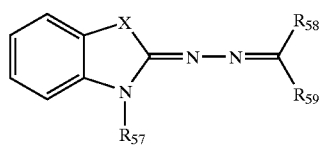
formula (15)

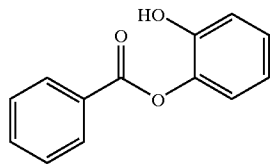
formula (16)

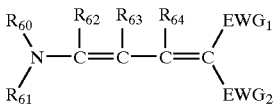
formula (17)

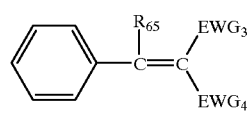
formula (18)

The ultraviolet absorbent group derived from formulae (10) through (18) may have one or more halogen atoms or substituents. Examples of the substituent include the same as the substituents denoted in $Sp_1$ above of formula (1). The repeating unit represented by formula (1) or (2) may have the ultraviolet absorbent structure represented by formula (3), (4), (5) or (19) or the ultraviolet absorbent structure (corresponding to formula (11)) in the repeating unit represented by formula (6) or (7).

In formulae (10) through (18), $R_{55}$ through $R_{65}$ independently represent a hydrogen atom, a halogen atom or a substituent. Examples of the substituent are the same as the substituents denoted in $Sp_1$ above of formula (1). It is preferred that in formula (12) $R_{55}$ and $R_{56}$ independently represent a hydrogen atom or an alkyl group, in formula (15) $R_{57}$, $R_{58}$ and $R_{59}$ independently represent a hydrogen atom, an alkyl group or an aryl group and in formula (17) $R_{60}$ and $R_{61}$ represent an alkyl group.

It is preferred that in formulae (17) and (18) $R_{62}$ through $R_{65}$ independently represent an alkyl group, an aryl group, an alkoxy group, an alkylthio group or an amino group. In formula (15) X represents a methylene group or a chalcogen atom, preferably a sulfur atom.

In formulae (17) and (18), $EWG_1$ through $EWG_4$ each represent an electron attractive group. Examples of the electron attractive group include an acylamino group (for example, a acetylamino group or a propionylamino group), a sulfonylamino group (for example, a methanesulfonylamino group or a benzenesulfonylamino group), a sulfamoylamino group (for example, dimethylsulfamoylamino group), a carbamoyl group (for example, a methylcarbamoyl group, an ethylcarbamoyl group or dimethylcarbamoyl group), a sulfamoyl group (for example, an ethylsulfamoyl group or dimethylsulfamoyl group), an alkoxycarbonyl group (for example, a methoxycarbonyl group or an ethoxycarbonyl group), an aryloxycarbonyl group (for example, a phenoxycarbonyl group), a sulfonyl group (for example, a methanesulfonyl group, a butanesulfonyl group or a phenylsulfonyl group), an acyl group (for example, an acetyl group, a propanoyl group or a butyloyl group), a nitro group, a cyano group and a halogen atom. The preferred substituent is a cyano group, an acyl group, a sulfonyl group, an alkoxycarbonyl group or a carbamoyl group.

$EWG_1$ and $EWG_2$ in formula (17) need not be simultaneously electron attractive groups, and either one may be an electron attractive group, and $EWG_3$ and $EWG_4$ in formula (18) need not be simultaneously electron attractive groups, and either one may be an electron attractive group. $R_{60}$ through $R_{64}$, $EWG_1$ and $EWG_2$ in formula (17) may combine with another to form a 5- or 6-member ring, and $R_{65}$, $EWG_3$ and $EWG_4$ in formula (18) may combine with another to form a 5- or 6-member ring.

In formula (2), $J_2$ and $J_3$ represent the same group as $J_1$ denoted in formula (1) above, and may be the same or different. $Sp_2$ and $Sp_3$ represent a divalent linkage group, which may have a halogen atom or a substituent, and may be the same or different, provided that the ultraviolet absorbent group bonds directly or through a spacer to at least one of $Sp_2$ and $Sp_3$ or a part or total of the ultraviolet absorbent group form in at least one of $Sp_2$ and $Sp_3$ a part of the polymer main chain. Examples of the divalent linkage group represented by $Sp_2$ and $Sp_3$ or its substituent include the same as those denoted in $Sp_1$ above.

Examples of the ultraviolet absorbent group include the same as those denoted in formula (1) above.

Another ultraviolet absorbent polymer of the invention may be any ultraviolet absorbent polymer comprising a repeating unit having an ultraviolet absorbent structure represented by formula (3), (4) or (5).

In formula (3), $R_{12}$ through $R_{25}$ independently represent a hydrogen atom, a halogen atom or a substituent, provided that the adjacent two of $R_{12}$ through $R_{25}$ may combine with each other to form a ring. Examples of the substituent include the same as those denoted in $Sp_1$ above of formula (1). Further, the ultraviolet absorbent structure represented by formula (3) bonds directly or through a spacer to the polymer main chain or a part or total of the ultraviolet absorbent group form a part of the polymer main chain. Examples of the spacer include the same as those denoted in formula (1) above.

In formula (4), $R_{26}$ and $R_{27}$ independently represent an alkyl group having a carbon atom number of 1 to 10; $R_{28}$, $R_{29}$ and $R_{30}$ independently represent an alkyl group, an alkoxy group, an alkylthio group or an amino group; and X and Y independently represent an electron attractive group, provided that $R_{26}$ through $R_{30}$, X and Y may have a halogen atom or a substituent. Examples of the electron attractive group include those denoted in $EWG_1$ through $EWG_4$ above, and examples of the substituent include the same as those denoted in $Sp_1$ of formula (1) above. The above alkyl group, alkoxy group, alkylthio group or amino group may be substituted or unsubstituted.

$R_{26}$ through $R_{30}$, X and Y may combine with another to form a 5- or 6-member ring. Further, the ultraviolet absorbent structure represented by formula (4) bonds directly or through a spacer to the polymer main chain or a part or total of the ultraviolet absorbent group form a part of the polymer main chain. Examples of the spacer include the same as those denoted in formula (1) above.

In formula (5), $R_{66}$ through $R_{71}$ independently represent a hydrogen atom, a halogen atom or a substituent, provided that $R_{66}$ through $R_{70}$ may combine with another to form a ring. Preferably $R_{66}$ through $R_{70}$ independently represent a hydrogen atom, a halogen atom, an alkyl group, an alkoxy group, an amino group or an alkylamino group, and $R_{71}$ represents a hydrogen atom, a halogen atom or an alkyl group. X and Y independently represent the same as X and Y denoted in formula (4) above, respectively. Further, the ultraviolet absorbent structure represented by formula (5) bonds directly or through a spacer to the polymer main chain or a part or total of the ultraviolet absorbent group form a part of the polymer main chain. Examples of the spacer include the same as those denoted in formula (1) above. The two adjacent groups of $R_{66}$ through $R_{71}$ may combine with each other to form a ring, but X and Y do not combine with each other and do not form a ring.

Another ultraviolet absorbent polymer of the invention may be any ultraviolet absorbent polymer comprising a repeating unit represented by formula (6) or (7), which is a copolymer of a repeating unit represented by formula (6) or (7) and another ethylenically unsaturated monomer unit.

In formula (6) or (7), $R_{31}$ through $R_{34}$ independently represent a halogen atom or a substituent. Examples of the substituent include the same as those denoted in $Sp_1$ of formula (1). l represents 0, 1, 2, or 3; m represents 0, 1, 2, 3, or 4; s represents 0, 1, 2, 3 or 4; o represents 0, 1, 2 or 3; $J_4$ represents a group selected from *—O—, *—$NR_1$—, *—S—, *—SO—, *—$SO_2$—, *—POO—, *—CO—, *—COO—, *—$NR_2$CO—, *—$NR_3$COO—, *—$NR_4CONR_5$—, *—OCO—, *—$OCONR_6$—, *—$CONR_7$—, *—$NR_8$SO—, *—$NR_9SO_2$—, *—$SONR_{10}$—, or *—$SO_2NR_{11}$—, in which symbol "*" represents that the group bonds to the ultraviolet absorbent group at the position "*" (at the side of $J_4$ opposite to $Sp_4$), and preferably represents *—O—, *—$NR_1$—, *—S—, *—SO—, *—$SO_2$—, *—$NR_3$COO— or *—$NR_4CONR_5$—. $J_5$ represents a group selected from *—O—, *—$NR_1$—, *—S—, *—SO—, *—$SO_2$—, *—POO—, *—CO—, *—COO—, *—$NR_2$CO—, *—$NR_3$COO—, *—$NR_4CONR_5$—, *—OCO—, *—$OCONR_6$—, *—$CONR_7$—, *—$NR_8$SO—, *—$NR_9SO_2$—, *—$SONR_{10}$—, or *—$SO_2NR_{11}$—, in which symbol "*" represents that the group bonds to the ultraviolet absorbent group at the position "*" (at the side of $J_5$ opposite to $Sp_5$), and preferably represents *—O—, *—$NR_1$—, *—S—, *—SO—, *—$SO_2$—, *—$NR_3$COO— or *—$NR_4CONR_5$—. $R_1$ through $R_{11}$ represent the same as $R_1$ through $R_{11}$ denoted in formula (1) above; and $Sp_4$ or $Sp_5$ represents a divalent linkage group which may have a halogen atom or a substituent, and examples of the linkage group or the substituent are the same as those denoted in $Sp_1$ of formula (1) above. When l is 2 or 3, plural $R_{31}$s may be the same or different, and when m is 2, 3, or 4, plural $R_{32}$s may be the same or different. When o is 2 or 3, plural $R_{34}$s may be the same or different, and when s is 2, 3, or 4, plural $R_{33}$s may be the same or different. It is preferred that in formula (6), l and m are not simultaneously 0, and in formula (7), s and o are not simultaneously 0. In formula (7), $Sp_5$ is preferably —C(=O)—O—$Sp_5'$—, in which $Sp_5'$ is the same as $Sp_5$, and $Sp_5'$ bonds with $J_5$.

Next, an ultraviolet absorbent polymer having an ultraviolet structure represented by formula (19) will be explained below.

In formula (19), the substituent represented by $R_{111}$ through $R_{116}$ may have a further substituent, unless otherwise specifically specified. Any one of $R_{111}$ through $R_{116}$ is a group comprising a polymerizable group represented by formula (20). In formula (20), L represents a divalent linkage or a single bond, and $R_{110}$ represents a hydrogen atom or a substituted or unsubstituted alkyl group. $R_{110}$ is preferably a hydrogen atom or an alkyl group having a carbon atom number of 1 to 4. The group comprising a polymerizable group represented by formula (20) may be any of a group represented by $R_{111}$ through $R_{116}$, but is preferably $R_{111}$, $R_{113}$, $R_{114}$ or $R_{115}$, and more preferably $R_{114}$.

$R_{111}$ represents a halogen atom or a substituent positioned on the benzene ring through an oxygen atom, a nitrogen atom or a sulfur atom. "a" represents an integer of from 1 to 4. $R_{112}$ represents a hydrogen atom, a substituted or unsubstituted aliphatic group, a substituted or unsubstituted aromatic hydrocarbon group or a substituted or unsubstituted heterocyclic group. When $R_{111}$ or $R_{112}$ is plural, plural $R_{111}$s or plural $R_{112}$s may be the same or different. $R_{113}$ $R_{115}$ and $R_{116}$ independently represent a hydrogen atom, a substituted or unsubstituted aliphatic group, a substituted or unsubstituted aromatic hydrocarbon group, or a substituted or unsubstituted heterocyclic group. $R_{114}$ represents a substituent positioned on the benzene ring through an oxygen atom or a nitrogen atom.

$R_{111}$ represents a halogen atom or a substituent positioned on the benzene ring through an oxygen atom, a nitrogen atom or a sulfur atom. The halogen atom is fluorine, chlorine, or bromine, and preferably chlorine.

Examples of the substituent positioned on the benzene ring through an oxygen atom include a hydroxy group, an alkoxy group (for example, a methoxy group, an ethoxy group, a t-butoxy group or a 2-ethoxyethoxy group), an aryloxy group (for example, a phenoxy group, a 2,4-di-t-amylphenoxy group or a 4-(4-hydroxyphenylsulfonyl) phenoxy group), a heterocyclicoxy group (for example, 4-pyridyloxy, or 2-hexahydropyranyloxy), a carbonyloxy group (for example, alkylcarbonyloxy such as acetyloxy, trifluoroacetyloxy, or pyvaloyloxy, or arylcarbonyloxy such as benzoyloxy, pentafluorobenzoyloxy), a urethan group (for example, alkylurethan such as N,N-dimethylurethan, or arylurethan such as N-phenylurethan or N-(p-cyanophenyl) urethan), and a sulfonyloxy group (for example, alkylsulfonyloxy such as methanesulfonyloxy, trifluoremethanesulfonyloxy or n-dodecanesulfonyloxy, arylsulfonyloxy such as benzenesulfonyloxy, or toluenesulfonyloxy), and the substituent is preferably an alkoxy group having a carbon atom number of 1 to 6, and preferably 2 to 4.

Examples of the substituent positioned on the benzene ring through a nitrogen atom include a nitro group, an amino group (for example, an alkylamino group such as dimethylamino, cyclohexylamino, or n-dodecylamino or an arylamino group such as anilino or p-t-octylanilino), a sulfonylamino group (for example, an alkylsulfonylamino group such as methanesulfonylamino, heptafluoropropane-sulfonylamino or hexadecylsulfonylamino, or an arylamino group such as p-toluenesulfonylamino or pentafluorobenzenesulfonylamino), a sulfamoylamino group (for example, an alkylsulfamoylamino such as N,N-dimethylsulfamoylamino or an arylsulfamoylamino group such as N-phenylsulfamoylamino), an acylamino group (for example, an alkylcarbonyl group such as acetylamino or myristoylamino or an arylcarbonyl group such as benzoylamino), and a ureido group (for example, an alkylureido group such as N,N-dimethylaminoureido or an arylureido group such as N-phenylureido or N-(p-cyanophenyl)ureido), and the substituent is preferably an acylamino group.

Examples of the substituent positioned on the benzene ring through a sulfur atom include an alkylthio group (for example, methylthio, t-octylthio), an arylthio group (for example, phenylthio), a heterocyclicthio (for example, 1-phenyltetrazole-5-thio or 5-methyl-1,3,4-oxadiazole-2-thio), a sulfinyl group (for example, alkylsulfinyl such as methanesulfinyl or trifluoromethanesulfinyl or arylsulfinyl such as p-toluenesulfinyl), a sulfonyl group (for example, alkylsulfonyl such as methanesulfonyl or trifluoromethanesulfonyl or arylsulfonyl such as p-toluenesulfonyl), and a sulfamoyl group (for example, alkylsulfamoyl such as dimethylsulfamoyl or 4-(2,4-di-t-amylphenoxy)butylaminosulfamoyl or arylsulfamoyl such as phenylsulfamoyl), and is preferably a sulfinyl group, and more preferably a sulfinyl group having a carbon atom number of 4 to 12.

"a" represents an integer of 1 to 4, and is preferably 1 or 2. When a is 2 or more, plural $R_{111}$s may be the same or different. The substitution position on the benzene ring of $R_{111}$ is not limited, but $R_{111}$ is positioned at preferably 4 or 5 position of the benzene ring.

$R_{112}$ represents a hydrogen atom, an aliphatic group (for example, alkyl, alkenyl, or alkinyl), an aryl group (for example, phenyl or p-chlorophenyl), or a heterocyclic group (for example, 2-tetrafurfuryl, 2-thiophenyl, 4-imidazolyl, indoline-1-yl or 2-pyridyl). $R_{112}$ is preferably a hydrogen atom or an alkyl group.

$R_{113}$ represents a hydrogen atom, an aliphatic group, an aryl group or a heterocyclic group. $R_{113}$ is preferably a hydrogen atom or an alkyl group having a carbon atom number of 1 to 12. $R_{113}$ is especially preferably a branched alkyl group such as i-propyl, t-butyl, or t-amyl, since it provides an excellent durability.

$R_{114}$ represents a substituent positioned on the benzene ring through an oxygen atom or a nitrogen atom, and examples of $R_{114}$ include the same group as those denoted in the substituent positioned on the benzene ring through an oxygen atom or a nitrogen atom of $R_{111}$. $R_{114}$ is preferably an acylamino group or an alkoxy group. When $R_{114}$ has a group represented by formula (20), it is preferred that $R_{114}$ has a group represented by the following formula (21). It is also preferred that $R_{114}$ has a group represented by the following formula (22). When $R_{114}$ has a group represented by formula (22), the structure represented by formula (19) does not need to have a group represented by formula (20).

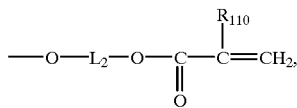

formula (21)

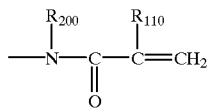

formula (22)

wherein $L_2$ represents an alkylene group having a carbon atom number of 1 to 12, and preferably a straight chained alkylene group having a carbon atom number of 3 to 6, $R_{110}$ represents a hydrogen atom or a methyl group, and $R_{200}$ represents an alkyl group having a carbon atom number of 1 to 12, and preferably 2 to 6.

$R_{115}$ represents a hydrogen atom, an aliphatic group, an aryl group or a heterocyclic group. $R_{115}$ is preferably a hydrogen atom or an alkyl group having a carbon atom number of 1 to 12, and especially preferably a branched alkyl group such as i-propyl, t-butyl, or t-amyl.

$R_{116}$ represents a hydrogen atom, an aliphatic group, an aryl group or a heterocyclic group. $R_{116}$ is preferably a hydrogen atom.

Preferred ultraviolet absorbing monomers used in the invention will be exemplified, below, but the invention is not limited thereto.

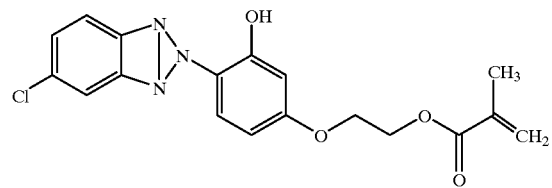

UVM-1

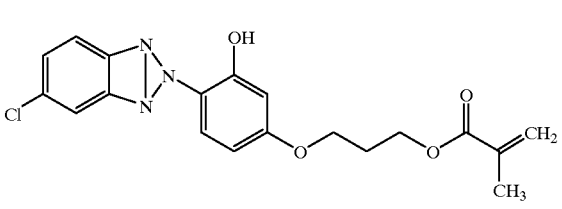

UVM-2

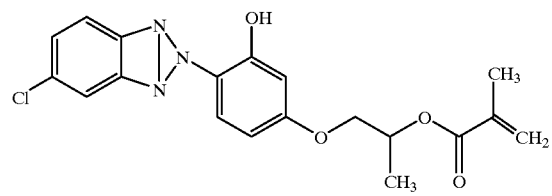

UVM-3

-continued
UVM-4
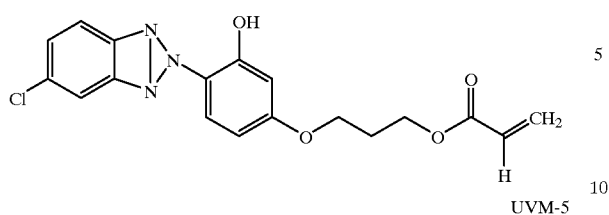
UVM-5
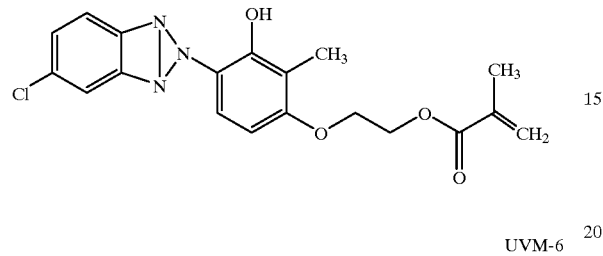
UVM-6
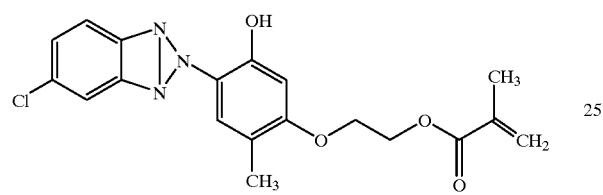
UVM-7
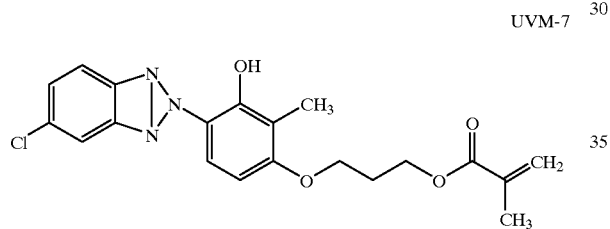
UVM-8
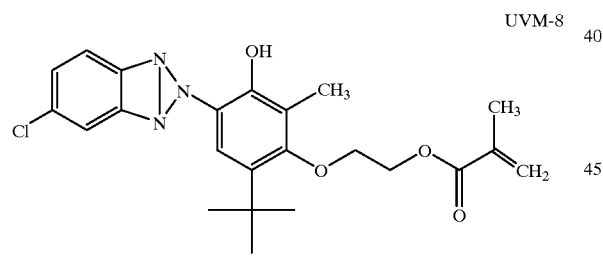
UVM-9
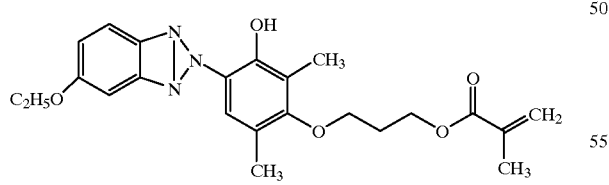
UVM-10
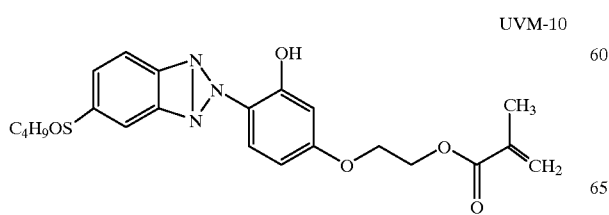
-continued
UVM-11
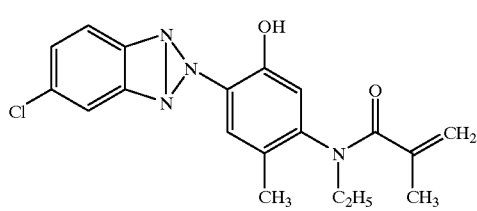
UVM-12
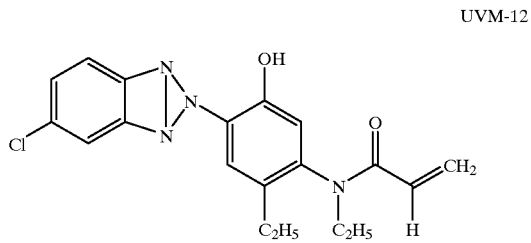
UVM-13
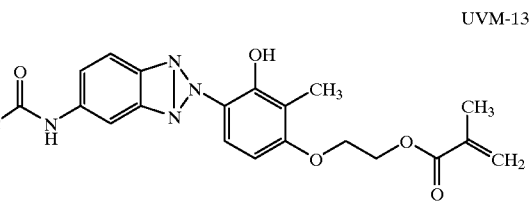
UVM-14
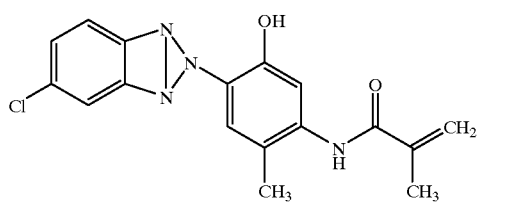
UVM-15
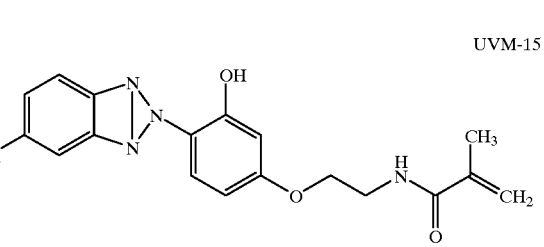
UVM-16
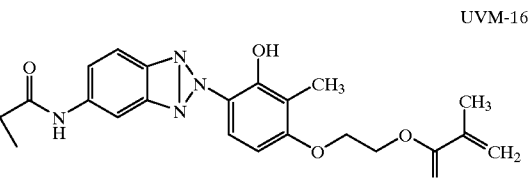
UVM-17
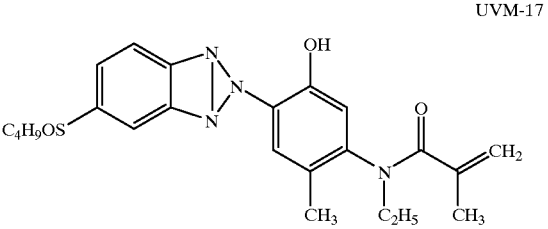

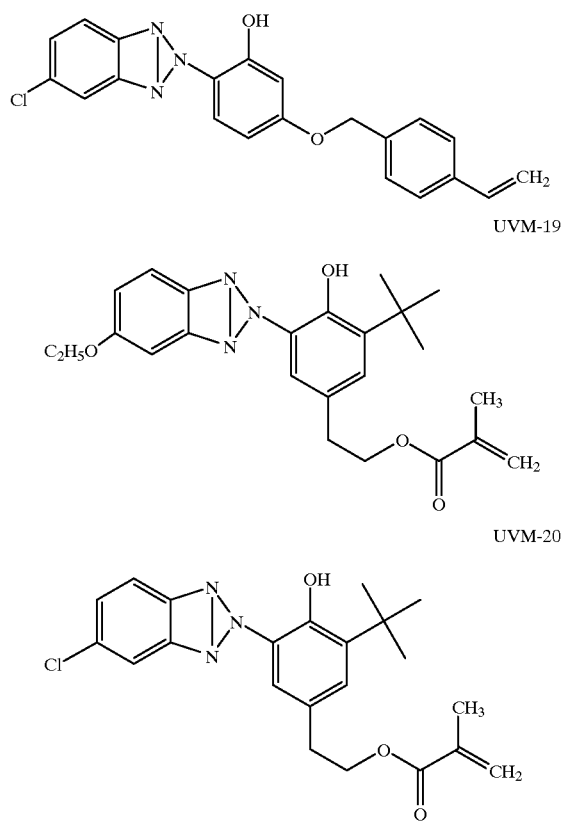

UVM-18

UVM-19

UVM-20

Further another ultraviolet absorbent polymer of the invention may be any ultraviolet absorbent polymer comprising a copolymer of a first monomer represented by formula (8) and a second monomer represented by formula (9).

In formula (8) or formula (9), $R_{35}$ and $R_{36}$ independently represent a halogen atom or a substituent. Examples of the substituent include the same as those denoted in $Sp_1$ of formula (1) above. r represents 0, 1, 2 or 3, and q represents 0, 1, 2, 3 or 4. When r is 2 or 3, plural $R_{36}$s may be the same or different, and when q is 2, 3 or 4, plural $R_{35}$s may be the same or different. $R_{37}$ through $R_{39}$ independently represent a hydrogen atom, a halogen atom or a substituent. $Sp_6$ represents a divalent linkage group which may have a halogen atom or a substituent, and examples of the linkage group or the substituent are the same as those denoted in $Sp_1$ of formula (1) above.

Still further another ultraviolet absorbent polymer of the invention may be any modified cellulose in which an ultraviolet absorbent group bonds directly or through a spacer to a hydroxy group of cellulose or its derivative. The modified cellulose in which an ultraviolet absorbent group bonds directly or through a spacer to a hydroxy group of cellulose or its derivative is a cellulose in which an ultraviolet absorbent group bonds directly or through a spacer to any one of the three hydroxy group contained in the repeating unit of cellulose. Examples of the ultraviolet absorbent group include the same as those denoted in $Sp_1$ of formula (1) above, and examples of the spacer are the same as those denoted in $Sp_1$ of formula (1) above. This ultraviolet absorbent polymer has an excellent compatibility with cellulose and does not produce bleeding out or crystal precipitation which has been problems during manufacture of a cellulose film or during saponification of the film with an alkali solution, since the repeating unit is a cellulose derivative. The repeating unit represented by formula (1) or (2), the ultraviolet absorbent structure represented by formula (3), (4), (5) or (19), or the ultraviolet absorbent structure (corresponding to formula (11)) in the repeating unit represented by formula (6) or (7) may bond directly or through a spacer to a hydroxy group of cellulose or its derivative.

The compound having an ultraviolet structure represented by formula (3), (4), (5), or the monomer, from which the repeating unit having an ultraviolet structure represented by formula (1), (2), (6), (7) or (19) is derived, preferably has a molar extinction coefficient at 380 nm of not less than 4000, and more preferably has a ratio of molar extinction coefficient at 380 nm to molar extinction coefficient at 400 nm of not less than 20.

The ultraviolet absorbent polymer in the invention comprises at least one of a polymer having a repeating unit represented by formula (1), (2), (6) or (7), a polymer comprising a repeating unit having an ultraviolet absorbent structure represented by formula (3), (4), (5) or (19), a copolymer of a monomer represented by formula (8) and a monomer represented by formula (9), and a modified cellulose in which an ultraviolet absorbent structure bonds directly or through a spacer to a hydroxy group of cellulose or its derivative. The ultraviolet absorbent polymer in the invention may be any homopolymer or any copolymer with another unit, as long as it comprises the repeating unit in the invention or the copolymer derived from the monomers in the invention.

Examples of the another monomer unit include a monomer unit comprising an acrylamide derivative, a monomer comprising an acrylate derivative, a monomer comprising a methacrylate derivative, a monomer comprising a vinyl ether derivative, a monomer comprising an ethylene oxide derivative, a monomer comprising a vinyl ester derivative, a monomer comprising a dicarboxylic acid derivative, a monomer comprising a diol derivative, and a monomer comprising a diamine derivative. When the ultraviolet absorbent polymer or modified cellulose in the invention is a copolymer, it is preferably a copolymer comprising an ethylenically unsaturated monomer unit. The ethylenically unsaturated monomer is especially preferably a methacrylate comprising a hydroxy group or an ether bond or an acrylate comprising a hydroxy group or an ether bond. Preferred examples of the ethylenically unsaturated monomer include methacrylic acid, methacrylate (for example, methyl methacrylate, ethyl methacrylate, propyl methacrylate, butyl methacrylate, i-butyl methacrylate, t-butyl methacrylate, octyl methacrylate, cyclohexyl methacrylate, 2-hydroxyethyl methacrylate, 2-hydroxypropyl methacrylate, tetrahydrofurfuryl methacrylate, benzyl methacrylate, dimethylaminoethyl methacrylate, or diethylaminoethyl methacrylate), acrylic acid, acrylate (for example, methyl acrylate, ethyl acrylate, propyl acrylate, butyl acrylate, i-butyl acrylate, t-butyl acrylate, octyl acrylate, cyclohexyl acrylate, 2-hydroxyethyl acrylate, 2-hydroxypropyl acrylate, tetrahydrofurfuryl acrylate, 2-ethoxyethyl acrylate, acrylic acid diethylene glycol ethoxylate, 3-methoxybutyl acrylate, benzyl acrylate, dimethylaminoethyl acrylate or diethylaminoethyl acrylate), alkyl vinyl ether (for example, methyl vinyl ether, ethyl vinyl ether or butyl vinyl ether), vinyl ester (for example, vinyl formate, vinyl acetate, vinyl butyrate, vinyl caproate or vinyl stearate), acrylonitrile, vinyl chloride, and styrene. Of these monomers, the preferred monomer is a methacrylate comprising a hydroxy group or an ether bond (for example, hydroxyethyl methacrylate, 2-hydroxypropyl methacrylate, tetrahydrofurfuryl methacrylate), or an acrylate comprising a hydroxy group or an ether bond (for example, 2-hydroxyethyl acrylate, 2-hydroxypropyl acrylate, tetrahydrofurfuryl acrylate, 2-ethoxyethyl acrylate, acrylic acid diethylene glycol ethoxylate or 3-methoxybutyl acrylate). One or more kinds of the monomer can be copolymerised with an ultraviolet absorbent monomer. The ultraviolet absorbent monomer content in the ultraviolet absorbent polymer is preferably 1 to 70% by weight, more preferably 20 to 70% by weight, and most preferably 30 to 60% by weight. Particularly when the ultraviolet absorbent polymer is a copolymer of a monomer unit represented by formula (6) and another ethylenically unsaturated monomer, the content of the monomer unit represented by formula (6) is preferably 1 to 45% by weight, more preferably 10 to 45% by weight, and most preferably 20 to 40% by weight. Particularly when the ultraviolet absorbent polymer is a copolymer of a monomer unit represented by formula (7) and another ethylenically unsaturated monomer, the content of the monomer unit represented by formula (7) is preferably 1 to 55% by weight, more preferably 10 to 55% by weight, and most preferably 20 to 50% by weight. Particularly when the ultraviolet absorbent polymer is a copolymer of a monomer unit represented by formula (19) and another ethylenically unsaturated monomer, the content of the monomer unit represented by formula (19) is preferably 1 to 55% by weight, more preferably 10 to 55% by weight, and most preferably 20 to 50% by weight.

The ultraviolet absorbent polymer used in the invention is contained in the cellulose ester film in an amount of preferably 0.01 to 40% by weight, and more preferably 0.01 to 30% by weight based on the weight of the cellulose ester. When the thickness of the cellulose ester film is not more than 65 $\mu$m, the content of the ultraviolet absorbent polymer is more preferably 1 to 10% by weight, and more preferably 1 to 5% by weight based on the weight of the cellulose ester. When the thickness of the cellulose ester film is not less than 70 $\mu$m, the content of the ultraviolet absorbent polymer is more preferably 0.5 to 5% by weight, and more preferably 0.5 to 2.5% by weight based on the weight of the cellulose ester. The content of the ultraviolet absorbent polymer used in the invention is not specifically limited, as long as the haze of the cellulose ester film of the invention is 0 to 0.5, but the haze is preferably 0 to 0.2. It is more preferred that the cellulose ester film has a haze of 0 to 0.2 and a transmittance at 380 nm of 0 to 10%.

When the ultraviolet absorbent polymer in the invention is mixed with cellulose ester, another low molecular weight compound, another polymer or inorganic compounds can be mixed. For example, a cellulose ester film comprising the ultraviolet absorbent polymer in the invention and a low molecular weight ultraviolet absorbing compound is one of the preferable embodiments of the invention.

The ultraviolet absorbent polymer in the invention can be used without any limitation as long as it is not a monomer. The weight average molecular weight of the ultraviolet absorbent polymer in the invention is preferably 500 to 1000000, more preferably 1000 to 100000, still more preferably 2000 to 20000, and most preferably 7000 to 15000.

Polymerization methods for obtaining the ultraviolet absorbent polymer in the invention are not specifically limited, but include a radical polymerization, an anion polymerization, and a cation polymerization. Initiators of the radical polymerization include azobisisobutyronitrile (AIBN), azobisisobutyric acid diester derivatives, and benzoyl peroxide.

Solvents used in the polymerization are not specifically limited, but include an aromatic hydrocarbon solvent such as toluene or chlorobenzene, a chlorinated hydrocarbon solvent such as dichloroethane or chloroform, an ether solvent such as tetrahydrofuran or dioxane, an amide solvent such as dimethylformamide, an alcohol solvent such as methyl alcohol, an ester solvent such as ethyl acetate, a ketone solvent such as acetone and water. Solution polymerization in a homogenious phase, precipitation polymerization in which polymerization products precipitate, and emulsion polymerization in a micelle can be carried out by selecting solvents for polymerization.

The ultraviolet absorbent polymer in the invention has an excellent compatibility with cellulose and high molecular weight as compared to the conventional low molecular weight ultraviolet absorbing compounds, and therefore, does not produce bleeding out or crystal precipitation which has been problems during manufacture of a cellulose film or during saponification of the film with an alkali solution, since the repeating unit is a cellulose derivative. Further haze is extremely low, and the ultraviolet absorbent polymer has sufficient resistance to ultraviolet rays, temperature and humidity, and provides a cellulose ester film having an excellent resistance to heat and humidity which does not lower an ultraviolet absorbing property under high humidity and high temperature condition.

The polarizing plate of the invention comprises a polarizing plate protective film, a polarizing element and a second polarizing plate protective film, wherein at least one of the first polarizing plate protective film and the second polarizing plate protective film is the cellulose ester film of the invention.

(Preparation of Polarizing Plate)

The polarizing plate can be prepared according to general methods. There is, for example, a method of treating the cellulose ester film of the invention with an alkali solution, immersing the film in an iodine solution while stretching, and then laminating a polyvinyl alcohol layer onto each surface of the resulting film employing completely saponified polyvinyl alcohol solution. The treatment with an alkali solution is to immerse the cellulose ester film in a strong alkali solution at high temperature in order to improve wettability of the film surface to an aqueous adhesive and improve its adhesiveness.

Next, the cellulose ester in the invention will be explained. The cellulose ester used in the invention is preferably a lower fatty acid ester of cellulose.

The lower fatty acid in the lower fatty acid ester of cellulose is a fatty acid having a carbon atom number of not more than 6. The lower fatty acid ester of cellulose is preferably cellulose acetate, cellulose propionate, or cellulose butyrate.

Besides the above, there can be used a mixture fatty acid ester such as cellulose acetate propionate or cellulose acetate butyrate disclosed in Japanese Patent O.P.I. Publication Nos. 10-45804 and 08-231761, and U.S. Pat. No. 2,319,052.

Cellulose triacetate is especially preferably used as the lower fatty acid ester of cellulose.

The cellulose ester in the invention has a polymerization degree of preferably 250 to 400, and a total substitution degree of preferably 2.3 to 3.0, and more preferably 2.6 to 2.8, in view of film strength. The preferred is cellulose acetate propionate having a total substitution degree of 2.3 to 2.8, an acetyl substitution degree of 1.5 to 2.5 and a propionyl substitution degree of 0.1 to 1.0.

The cellulose triacetate in the invention is a cellulose triacetate synthesized from cotton lint or a cellulose triacetate synthesized from tree pulp, which can be used singly or in combination. If there is any problem in separation of the film from a belt or drum on which the film is formed, the cellulose triacetate synthesized from cotton lint is preferably used in a larger amount, since the triacetate has good separability, and results in higher productive efficiency. When the cellulose triacetate synthesized from tree pulp is mixed, the content of the cellulose triacetate synthesized from cotton lint in the cellulose triacetate mixture is preferably not less than 40 weight %, in view of separability, more preferably not less than 60 weight %, and most preferably 100 weight %.

The polarizing film, which is a main component of the polarizing plate in the invention, is a film transmitting only a light having a wave front of a specific direction. The typical polarizing film is a polyvinyl alcohol polarizing film which is dyed with iodine or two color type dye. The polarizing film is manufactured by making a film from an aqueous polyvinyl alcohol solution, uniaxially stretching the film and dyeing the stretched film or dyeing the film and then uniaxially stretching the dyed film. The resulting film is preferably treated with a boron compound for its durability. The polarizing plate of the invention is formed laminating a transparent polarizing plate protective film in the invention to the surface of the polarizing film.

The manufacturing method of the cellulose ester film of the invention will be explained below.

In the invention dope in which cellulose ester is dissolved is a solution in which cellulose ester is dissolved in a solvent. The dope optionally contains a plasticizer or another additive. The cellulose ester content of the dope is preferably 10 to 30 weight %, and more preferably 18 to 20 weight %.

The solvent used in the invention may be used singly, but is preferably used as a mixture solvent of a good solvent and a poor solvent, in view of productive efficiency. The good solvent content of the mixture solvent is preferably 70 to 95 weight %, and the poor solvent content of the mixture solvent is preferably 5 to 30 weight %. The cellulose ester content of the cellulose ester solution in the invention is preferably 10 to 50 weight %, and more preferably 18 to 20 weight %.

In the invention, a good solvent is defined as a solvent capable of dissolving cellulose esters, and a poor solvent as a solvent which only swells and cannot dissolve cellulose esters. Therefore, whether a solvent is a good solvent or a poor solvent for cellulose esters depends on the acetic acid value of the cellulose ester used. For example, acetone is a good solvent for a cellulose ester with an acetic acid value of 55%, but is a poor solvent for a cellulose ester with an acetic acid value of 60%.

The good solvents in the invention include an organic halogen-containing compound and dioxolane.

Examples of the solvent, which is a good solvent or a poor solvent for cellulose esters depending on the acetic acid value of the cellulose ester used, include acetone, methyl acetate and ethyl acetate.

Examples of the poor solvent used in the invention include methanol, ethanol, n-butanol, and cyclohexane.

In preparation of the dope described above, dissolving a cellulose ester in a solvent is carried out according to conventional processes. The preferable process is a process of mixing a cellulose ester with a poor solvent to swell the ester, and then adding a good solvent to the mixture. In this process, the cellulose ester is preferably dissolved with stirring under increased pressure at from the boiling point at atmospheric pressure of the solvent to a temperature at which the solvent is not boiled, since undissolved matters such as gelled lumps do not produce.

The pressure application is carried out by incorporating to the vessel an inactive gas such as nitrogen with pressure or by increasing a solvent vapor pressure in the vessel by heating. Heating is preferably carried out outside the vessel, and a jacket type vessel is preferable, since heating temperature is easily controlled.

The heating temperature is preferably in the range of from the boiling point of a solvent used to a temperature at which the solvent is not boiled, for example, preferably in the range of 60° C. to 70–110° C. The pressure applied is determined not to boil the solvent at a given temperature.

After dissolving a cellulose ester in a solvent in a vessel to obtain a dope, the dope is removed from the vessel while cooling, or is removed with a pump and then cooled with a heat exchanger. The resulting cooled dope is used for manufacturing a film. The cooling temperature may be cooled to an ordinary temperature, but is preferably cooled to a temperature of 5 to 10° C. below the boiling point of the solvent, since the viscosity of the dope is reduced for casting.

The support used at the casting step is a belt or drum type stainless steel support with a smooth surface. Casting of the solution at the casting step can be carried out in the conventional temperature range of 0° C. to a temperature less than the boiling point of the solvent. The dope is cast on the support of preferably 5 to 30° C., and more preferably 5 to 15° C., since the dope can be gelled to shorten a critical separation time. The critical separation time herein referred to implies time when dope is present on a casting support when the dope is cast on the support at a maximum casting speed capable of continuously forming a transparent film with excellent surface smoothness. The critical separation time is preferably short, in view of productive efficiency.

It is preferred that the surface temperature of the support is 10 to 55° C., the dope temperature is 25 to 60° C., and the dope temperature is not less than 0° C., preferably not less than 5° C. higher than the support surface.

The higher the temperature of the support surface or dope is, more preferable, in view of the drying speed. However, too much high temperature thereof results in foaming or deterioration of flatness of the film.

The surface temperature of the support is more preferably 20 to 40° C., and the dope temperature is preferably 35 to 45° C.

The peeling temperature of the film from the support is preferably 10 to 40° C., and more preferably 15 to 00° C., since adhesiveness between the support and the film is reduced.

In order to obtain a good flatness of the support, the residual solvent content of the film, when the film is peeled from the support, is preferably 10 to 80%, more preferably 20 to 40%, and most preferably 20 to 30%.

In the invention, the residual solvent content of the film is represented by the following equation:

Residual solvent content=(Weight of film before heating treatment−weight of film after heating treatment)×100 (%)/(weight of film after heating treatment)

wherein the heating treatment is to heat the film at 115° C. for 1 hour.

Peeling tension, when the film is peeled from the support, is ordinarily 196 to 245 N (20 to 25 kgf)/m. The cellulose ester film of the invention containing a high content of the ultraviolet absorbent polymer, which is thinner than conventional films, is peeled at a peeling tension of preferably from the lowest peeling tension to 167 N (17 kgf)/m, and more preferably from the lowest peeling tension to 137 N (14 kgf)/m, since wrinkles are easy to form.

The cellulose ester film separated from the support is further dried in the drying process to give a residual solvent content in the film of preferably not more than 3 weight %, and more preferably not more than 0.5 weight %.

In the drying process of the film, the film is generally transporting on rollers or in a tenter while drying. The support film for a liquid crystal display member is preferably dried maintaining the film width in a pintenter, which increases dimensional stability of the film. It is especially preferable in view of remarked increased film dimensional stability that the film is dried while holding the film width of a film immediately after the film is separated from the support, which still has a relatively high residual solvent content. The means for drying the film is not specifically limited, but heated air, infrared light, heated rollers or micro waves are generally employed. The heated air is preferably used in view of its convenience. It is preferable that the drying temperature is gradually elevated in separate 3 to 5 stages in the range of from 40 to 140° C. It is more preferable in view of film dimensional stability that the drying temperature is gradually elevated in separate 3 to 5 stages in the range of from 80 to 140° C.

The cellulose ester film of the invention preferably contains a plasticizer. The plasticizer used in the invention is not limited, but Examples of the plasticizer include a phosphate such as triphenyl phosphate, tricresyl phosphate, cresyldiphenyl phosphate, octyldiphenyl phosphate, diphenylbiphenyl phosphate, trioctyl phosphate, or tributyl phosphate, a phthalate such as diethyl phthalate, dimethoxyethyl phthalate, dimethyl phthalate, dioctyl phthalate, dibutyl phthalate, or di-2-ethylhexyl phthalate, a glycerin ester such as triacetin, tributyrin, and a glycolic acid ester such as butyl phthalyl butyl glycolate, ethyl phthalyl ethyl glycolate, methyl phthalyl ethyl glycolate, or butyl phthalyl butyl glycolate. These plasticizers may be used singly or in combination.

These plasticizers provide a film having an excellent dimensional stability and water resistance.

Combined use of the above-described ultraviolet absorbent polymer and a plasticizer with a melting point of not more than 20° C. is preferable in view of processability, prevention of foreign matter trouble or the film surface quality. The plasticizer with a melting point of not more than 20° C. is not limited as long as it has a melting point of not more than 20° C., and can be selected from the above-described examples. The preferable plasticizers include tricresyl phosphate, cresyldiphenyl phosphate, tributyl phosphate, diethyl phthalate, dimethyl phthalate, dioctyl phthalate, dibutyl phthalate, di-2-ethylhexyl phthalate, triacetin, and ethyl phthalyl ethyl glycolate. These plasticizers may be used singly or in combination.

The melting point referred to in the invention is the melting point as described in "Kagaku Daijiten", published by Kyoritsu Shuppann Co., Ltd.

The plasticizer content of the cellulose ester film is preferably 1 to 15 weight % based on weight of the cellulose ester, in view of film properties or processability. Further, the plasticizer content of the cellulose ester film for a liquid crystal display material is more preferably 5 to 15 weight %, and especially preferably 7 to 12 weight % based on weight of the cellulose ester, in view of dimensional stability.

Furthermore, the content of the plasticizer with a melting point of not more than 20° C. is preferably 1 to 10 weight %, and more preferably 3 to 7 weight % based on weight of the cellulose ester.

Processability herein referred to means processability in slitting or punching a liquid crystal display material. Poor processability provides a jagged slitting surface or produces chips whose adhesion to the film surface results in foreign matter trouble.

The cellulose ester film of the invention is preferably applied to a liquid crystal display material, in view of good dimensional stability or good ultraviolet ray shielding property. The liquid crystal display material is a material used in a liquid crystal display, for example, a polarizing plate, a protective film of a polarizing plate, a phase difference film, a reflection plate, a viewing angle increasing film, an antiglare film, a non-reflective film, or an antistatic film. The cellulose ester film of the invention is especially preferably applied to a polarizing plate or a protective film of a polarizing plate each requiring an excellent dimensional stability. The thickness of the cellulose ester film of the invention differs depending on its usage, but is preferably 5 to 200 μm, more preferably 10 to 100 μm, and most preferably 20 to 65 μm.

The optical film of the invention optionally contains fine particles as a matting agent. The fine particles used in the invention include inorganic compounds such as silicon dioxide, titanium dioxide, aluminum oxide, zirconium oxide, calcium carbonate, talc, clay, burned kaolin, burned calcium silicate, hydrated calcium silicate, aluminum silicate, magnesium silicate, and calcium phosphate. The fine particles are preferably those containing silicon in view of low turbidity, and especially preferably silicon dioxide. The silicon dioxide fine particles are available on the market, for example, Aerosil R972, R972V, R974, R812, 200, 200V, 300, R202, OX50, or TT600 (each produced by Nihon Aerosil Co., Ltd.). The zirconium oxide fine particles are available on the market, for example, Aerosil R976 or R811 (each produced by Nihon Aerosil Co., Ltd.).

Aerosil 200V or Aerosil R972V is especially preferable in that it reduces coefficient of friction and maintains low turbidity of the optical film.

Examples of the polymer fine particles include silicon resins, fluorine-containing resins and acryl resins. Silicon resins are preferable. Silicon resins having a three dimensionally cross-linked structure are especially preferable, which are available on the market, and include for example, Tospar 103, Tospar 105, Tospar 108, Tospar 120, Tospar 145, Tospar 3210 and Tospar 240 (each produced by Toshiba Silicon Co., Ltd.)

Next, the optical compensation film of the invention will be explained. The optical compensation film herein referred to is a film having optical anisotropy used in the liquid crystal display, and generally manufactured by providing on a support an optically anisotropic layer.

The optical compensation film of the invention has an optically anisotropic layer on a support comprised of the cellulose ester film of any one of items 1 through 20 as described previously. The compound used in the optically anisotropic layer is preferably a discotic compound, a biaxial liquid crystalline compound, or a rod-shaped liquid crystalline compound, and more preferably a discotic compound having a nematic phase, a biaxial liquid crystalline compound having a nematic phase, or a rod-shaped liquid crystalline compound having a nematic phase.

Examples of the discotic compound include benzene derivatives, cyclohexane derivatives, polycyclic compounds of azacrown type, polycyclic compounds of phenylacetylene type, triphenylene derivatives, truxene derivatives, phthalocyanine derivatives, anthraquinones derivatives, bullvalene derivatives, bipyranylidene derivatives, and β-diketone complexes. The preferred discotic compounds are discotic liquid crystalline compounds have a structure having the above-described discotic compounds as nucleus in the molecular center and having a straight-chained alkyl group or alkoxy group or a substituted benzoyloxy group in a radiate manner as the molecular side chain. The discotic compounds are not limited thereto as long as they have a negative uniaxiality and can provide a certain orientation.

The biaxial liquid crystalline compound herein referred to is a liquid crystalline compound having two optic axes in the liquid crystal phase. In other words, the biaxial liquid crystalline compound is a compound satisfying n1<n2<n3, wherein n1, n2, and n3 represent a refractive index in three axis directions. Examples of the biaxial liquid crystalline compound include liquid crystalline compounds described in for example, "Handbook of Liquid Crystals Chapter XV Biaxial Nematic Liquid Crystals". However, the biaxial liquid crystalline compound is not limited to those described above, as long as it is a compound capable of providing a certain orientation in which refractive index in one direction is different from refractive index in another direction.

The rod-shaped liquid crystalline compound is the most general liquid crystalline compound, and a compound whose molecule is regarded as being rod-shaped. The rod-shaped compound is a compound in which when "a" is a major axis and "b" is a minor axis, a/b is sufficiently large. a/b is preferably not less than 2, and more preferably not less than 3. However, the rod-shaped liquid crystalline compound is not limited to those described above, as long as it is a positive uniaxial compound capable of providing a certain orientation.

These liquid crystalline compounds are used singly or as a mixture of two or more kinds. These compounds may be low molecular or high molecular compounds. Orientation of these compounds is fixed without losing the orientation form in the liquid crystal phase as follows. These compounds are mixed with polymers, these compounds are elevated to temperature developing the liquid crystal phase, and then cooled maintaining the orientation form, or a composition containing a liquid crystalline compound in which a polymerizable group is incorporated and initiator is elevated to temperature developing the liquid crystal phase, followed by polymerization.

The materials for a protective film include polymers such as polymethyl methacrylate, acrylic acid-methacrylic acid copolymer, styrene-maleimide copolymer, polyvinyl alcohol, poly(N-methylolacrylamide), styrene-vinyl toluene copolymer, chlorosulfonated polyethylene, nitrocellulose, polyvinyl chloride, chlorinated polyolefin, polyester, polyimide, vinyl acetate-vinyl chloride copolymer, ethylene-vinyl acetate copolymer, polyethylene, polypropylene, and polycarbonate, and compounds such as silane coupling agents. The materials for a protective film include a multi-layered film (LB film) of ω-tricosanoic acid, dioctadecylmethyl-ammonium chloride or methyl stearate, which is formed according to a Langmuir-Projet method.

The light source for polymerization is preferably an electron beam, ultraviolet light, visible light, or infrared light (heat ray), and more preferably ultraviolet light. Radical polymerization employing a photopolymerization initiator or cation polymerization, which is carried out employing ultraviolet light, is preferable in view of polymerization speed and productivity. The light source for radical polymerization is preferably a low pressure mercury lamp, a high pressure discharging lamp or a short arc discharging lamp, and more preferably a high pressure discharging lamp.

The optical compensation film of the invention is a film for compensating a viewing angle of a liquid crystal display, preferably a film in which a director on one side of the film is different from that on the other side, and more preferably a film in which the hybrid orientation gradually varies in the film thickness direction.

In order to obtain the hybrid orientation in the invention, a liquid crystalline material is provided between two different boundaries, or electric field or magnetic field is applied. One embodiment employs one substrate and atmospheric boundary, in which one side of a liquid crystalline layer has the substrate, the other side of the liquid crystalline layer facing atmospheric air. It is preferred that the liquid crystalline layer is coated on the substrate, with one side of the liquid crystalline layer facing atmospheric air.

An oriented plate preferably used in the invention controls an orientation direction of a liquid crystalline compound in an optically anisotropic layer. The oriented plate has for example, a rubbing layer containing an organic compound (preferably a polymer), an inorganic compound oblique evaporation layer, a layer having a microgruoub, or a multi-layered film (LB film) of ω-tricosanoic acid, dioctadecylmethylammonium chloride or methyl stearate, which is formed according to a Langmuir-Projet method. Further, an oriented plate can be used, which has a layer capable of producing orientation by application of an electric or magnetic field or by light irradiation.

The optical compensation film of the invention can be obtained by coating on the above-described oriented plate the above-described liquid crystalline compound, orienting uniformly the compound and then fixing the oriented compound. The coating is carried out employing a solution in which the liquid crystalline compound is dissolved in a solvent or the liquid crystalline compound to have been heat fused, and preferably is carried out employing the solution.

The above-described solution is coated on the above-described oriented plate. The coating methods include an evaporation method, a spin coating method, a dip coating method, and an extrusion method. After coating, the solvent is removed and dried to form a layer with uniform film thickness on the plate. The coated layer is dried at room temperature, on a hot plate, in a drying chamber, or blowing a warm or hot air.

In order to orient the liquid crystalline compound, heat treatment is preferably carried out, and the heat treatment is carried out at temperature of not less than a liquid crystal transition point of the liquid crystalline compound. That is, the liquid crystalline compound is oriented in the liquid crystal state, or is oriented by elevating to temperature not less than a temperature range developing a liquid crystal state to form an isotropic state, and then cooling to temperature developing a liquid crystal state. Temperature in the heat treatment is ordinarily 0 to 200° C., and preferably 20 to 150° C.

In the invention, electric field or magnetic field may be used in the above heat treatment in order to orient the liquid crystalline compound. The above orientation is fixed by cooling or by polymerization due to light or heat application without losing the orientation to obtain the optical compensation film of the invention.

Application of one or more of the optical compensation film of the invention to a liquid crystal display can develop excellent optical compensation effects. One embodiment of the liquid crystal display of the invention is a liquid crystal display comprising a first polarizing plate, a second polarizing plate, and a liquid crystal cell provided between the first and second polarizing plates, the first polarizing plate being arranged on the viewer side of the display. The first polarizing plate has a first film, a second film and a first polarizing film between the first and second films so that the second film is provided on the first polarizing film on the liquid crystal cell side. The second polarizing plate has a third film, a fourth film and a second polarizing film between the third and fourth films so that the third film is provided on the second polarizing film on the liquid crystal cell side. Further, at least one of the first, second, third and fourth films is the cellulose ester film of the invention. The first film is preferably the cellulose ester film of the invention.

Next, synthetic examples of the ultraviolet absorbent polymer will be explained. However, the invention is not limited thereto (synthetic examples 1 through 9).

SYNTHETIC EXAMPLE 1

Synthesis of Polymer A, Example of a Polymer Comprising Formula (2)

Dihydroxybenzotriazole compound (a)

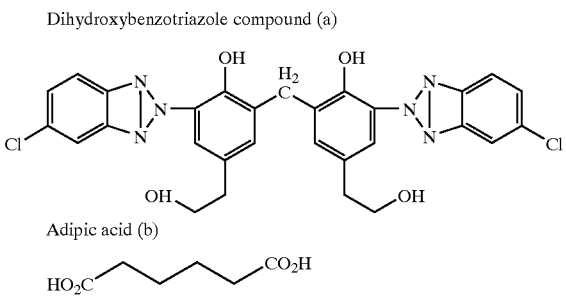

Adipic acid (b)

$HO_2C\diagup\diagdown\diagup CO_2H$

A vacuum polymerization tube equipped with a stirrer was charged with 11.83 g (20 mmol) of dihydroxybenzotriazole compound (a), 2.92 g (20 mmol) of adipic acid (b) and 0.02 g of antimony oxide to obtain a solution. A nitrogen gas introducing tube was connected with the tube. The polymerization tube was placed in an oil bath, and the nitrogen gas was introduced while heating to 180° C. The resulting solution was gradually heated at 270° C. while stirring, the vacuum degree of the polymerization tube being increased to be 102 Pa, heated at 270° C. at 3 hours, and allowed to cool. Thus, polymer A was quantitatively obtained. The molecular weight of the polymer A was measured according to gel permeation chromatography, and the number average molecular weight of the polymer A was 12,500. The chemical structure of polymer A was confirmed according to 1H-NMR.

SYNTHETIC EXAMPLE 2

Synthesis of Polymer B, Example of a Polymer Comprising Formula (2) or (3)

Pentahydroxytriazine compound (c)

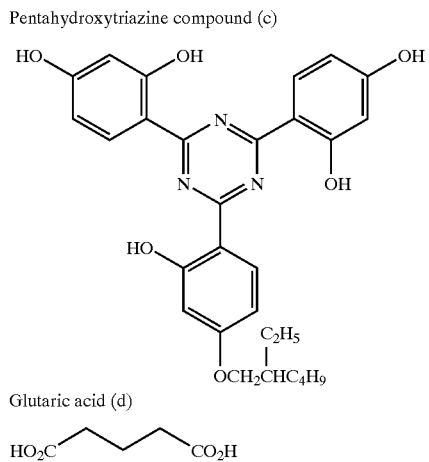

Glutaric acid (d)

$HO_2C\diagup\diagdown\diagup CO_2H$

A vacuum polymerization tube equipped with a stirrer was charged with 10.35 g (20 mmol) of pentahydroxytriazine compound (c), 2.64 g (20 mmol) of glutaric acid (d) and 0.02 g of antimony oxide to obtain a solution. A nitrogen gas introducing tube was connected with the tube. The polymerization tube was placed in an oil bath, and the nitrogen gas was introduced while heating to 180° C. The resulting solution was gradually heated at 270° C. while stirring, the vacuum degree of the polymerization tube being increased to be 102 Pa, heated at 270° C. at 3 hours, and allowed to cool. Thus, polymer B was quantitatively obtained. The molecular weight of the polymer B was measured according to gel permeation chromatography, and the number average molecular weight of the polymer B was 23,000. The chemical structure of polymer B was confirmed according to 1H-NMR.

SYNTHETIC EXAMPLE 3

Synthesis of Polymer C, Example of a Polymer Comprising Formula (7)

Acryl monomer (e)

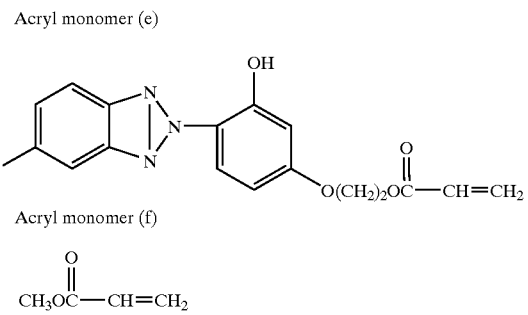

Acryl monomer (f)

$$CH_3O\overset{O}{\overset{\|}{C}}-CH=CH_2$$

A 100 ml three-necked flask was charged with 7.18 g (20 mmol) of acryl monomer (e) and 10.75 g (20 mmol) of acryl monomer (f). The flask was evacuated using a vacuum pump, and replaced with nitrogen three times. To the flask were added 60 ml of anhydrous tetrahydrofuran and the resulting solution was heated under reflux. A tetrahydrofuran solution containing 1.16 g (7.25 mmol) of AIBN was added to the solution, and further heated for additional 3 hours. After evaporating the reaction solvent under reduced pressure, a small amount of tetrahydrofuran was added to the residue to obtain a solution. The solution was re-precipitated in acetone, and the resulting precipitates were filtered off. Thus, polymer C was quantitatively obtained. The molecular weight of the polymer C was measured according to gel permeation chromatography, and the number average molecular weight of the polymer C was 16,800. The acryl monomer (e) to (f) content ratio by weight % in polymer C was confirmed according to 1H-NMR to be 40:60.

SYNTHETIC EXAMPLE 4

Synthesis of Polymer D, Example of a Copolymer of Formula (8) and (9)

Methacryl monomer (g)

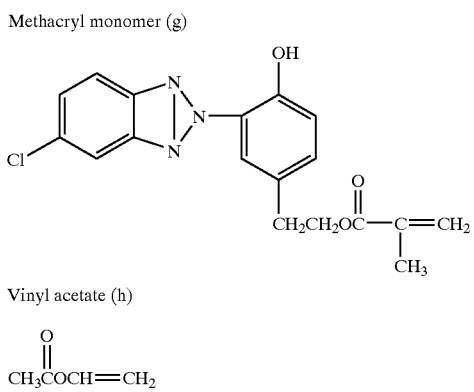

Vinyl acetate (h)

$$CH_3\overset{O}{\overset{\|}{C}}OCH=CH_2$$

A 100 ml three-necked flask was charged with 6.46 g (20 mmol) of methacryl monomer (g) and 4.31 g (50 mmol) of vinyl acetate (h). The flask was evacuated using a vacuum pump, and replaced with nitrogen three times. To the flask were added 60 ml of anhydrous tetrahydrofuran and the resulting solution was heated under reflux. A tetrahydrofuran solution containing 0.57 g (3.5 mmol) of AIBN was added to the solution, and further heated for additional 3 hours. After evaporating the reaction solvent under reduced pressure, a small amount of tetrahydrofuran was added to the residue to obtain a solution. The solution was re-precipitated in acetone, and the resulting precipitates were filtered off. Thus, polymer D was quantitatively obtained. The molecular weight of the polymer D was measured according to gel permeation chromatography, and the number average molecular weight of the polymer D was 19,500. The methacryl monomer (g) to vinyl acetate (h) content ratio by weight % in polymer D was confirmed according to 1H-NMR to be 50:50.

SYNTHETIC EXAMPLE 5
Synthesis of Polymer E, Example of Modified Cellulose

Alkyl halide monomer (i)

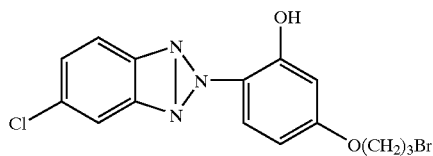

A 100 ml three-necked flask was charged with 10.0 g of diacetyl cellulose, 20 ml of tetrahydrofuran, 11.0 g (80 mmol) of potassium carbonate, and 16.0 g (50 mmol) of alkyl halide monomer (i) to obtain a solution. The resulting solution was heated for 3 hours under reflux. After evaporating the reaction solvent under reduced pressure, a small amount of DMF was added to the residue to obtain a solution. The solution was re-precipitated in hexane, and the resulting precipitates were filtered off. Thus, polymer E was obtained. The chemical structure of polymer E was confirmed according to 1H-NMR.

SYNTHETIC EXAMPLE 6
Synthesis of Polymer F, Example of a Polymer Comprising Formula (6)

Vinyl monomer (j)

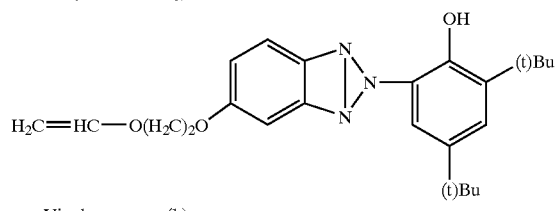

Vinyl monomer (k)

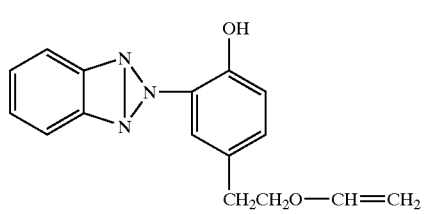

Vinyl monomer (l)

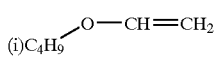

A 100 ml three-necked flask was charged with 4.09 g (10 mmol) of vinyl monomer (j), 2.53 g (9 mmol) of vinyl monomer (k), and 9.50 g (95 mmol) of vinyl monomer (l). The flask was evacuated using a vacuum pump, and replaced with nitrogen three times. To the flask were added 60 ml of anhydrous tetrahydrofuran and the resulting solution was heated under reflux. A tetrahydrofuran solution containing 0.93 g (5.7 mmol) of AIBN was added to the solution, and further heated under reflux for additional 3 hours. After evaporating the reaction solvent under reduced pressure, the smallest amount of tetrahydrofuran was added to the residue to obtain a solution. The solution was re-precipitated in acetone, and the resulting precipitates were filtered off. Thus, polymer F was quantitatively obtained. The molecular weight of the polymer F was measured according to gel permeation chromatography, and the number average molecular weight of the polymer F was 21,000. The vinyl monomer (j):vinyl monomer (k):vinyl monomer (l) content ratio by weight % in polymer F was confirmed according to 1H-NMR to be 25:15:60.

SYNTHETIC EXAMPLE 7
Synthesis of Polymer G, Example of a Polymer Comprising Formula (4)

Carboxylic acid monomer (m)

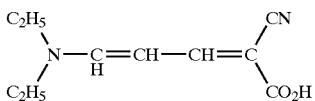

A 100 ml eggplant type flask was charged with 1.94 g (10 mmol) of carboxylic acid monomer (m), 10 ml of methylene chloride, 1.50 g (12 mmol) of oxalyl chloride, and several drops of dimethylformamide. The resulting mixture was stirred for one hour, and the solvent was evaporated under reduced pressure to obtain an acid chloride of carboxylic acid monomer (m). To the flask were added 1.32 g of polyvinyl alcohol (n÷2000), 30 ml of tetrahydrofuran and 0.95 g (12 mmol) of pyridine and the resulting solution was stirred for 3 hours. After evaporating the reaction solvent under reduced pressure, a small amount of tetrahydrofuran was added to the residue to obtain a solution. The solution was re-precipitated in ethyl acetate, and the resulting precipitates were filtered off. Thus, polymer G was obtained. Polymer G was confirmed according to 1H-NMR and IR to be polyvinyl alcohol having a substitution degree of 27%.

SYNTHETIC EXAMPLE 8
Synthesis of Polymer H, Example of a Polymer Comprising Formula (5)

Carboxylic acid monomer (n)

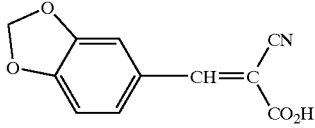

A 100 ml eggplant type flask was charged with 2.17 g (10 mmol) of carboxylic acid monomer (n), 10 ml of methylene chloride, 1.50 g (12 mmol) of oxalyl chloride, and several drops of dimethylformamide. The resulting mixture was stirred for one hour, and the solvent was evaporated under reduced pressure to obtain an acid chloride of carboxylic acid monomer (n). To the flask were added 1.32 g of polyvinyl alcohol (n÷2000), 30 ml of tetrahydrofuran and 0.95 g (12 mmol) of pyridine and the resulting solution was stirred for 3 hours. After evaporating the reaction solvent under reduced pressure, a small amount of tetrahydrofuran was added to the residue to obtain a solution. The solution was re-precipitated in ethyl acetate, and the resulting precipitates were filtered off. Thus, polymer H was obtained. Polymer H was confirmed according to 1H-NMR and IR to be polyvinyl alcohol having a substitution degree of 25%.

SYNTHETIC EXAMPLE 9

Synthesis of Polymer I, Example of a Polymer Comprising Formula (1)

Ethylene oxide monomer (o)

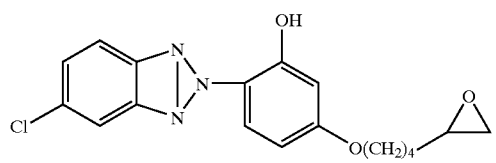

A 100 ml three-necked flask was evacuated using a vacuum pump, and replaced with nitrogen three times. Sixty milliliters of anhydrous diethyl ether, 13.34 g (40 mmol) of ethylene oxide monomer (o) and 0.06 g (0.4 mmol) of $BF_3 \cdot OEt_2$ were added to the flask, and stirred at 0° C. for 3 hours. After evaporating the reaction solvent under reduced pressure, a small amount of tetrahydrofuran was added to the residue to obtain a solution. The solution was re-precipitated in acetone, and the resulting precipitates were filtered off. Thus, polymer I was obtained. The molecular weight of polymer I was measured according to gel permeation chromatography, and the number average molecular weight of polymer C was 6,200. The chemical structure of polymer I was confirmed according to 1H-NMR.

SYNTHETIC EXAMPLE 10

Synthesis of Polymer J (Comparative)

Acryl monomer (p)

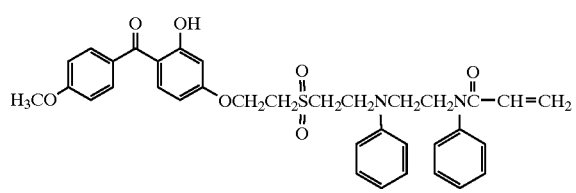

Acryl monomer (q)

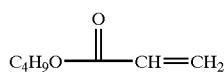

Fifty grams of acryl monomer (p) and 10 g of acryl monomer (q) were dissolved in 150 ml of dioxane. A solution in which 270 mg of 2,2'-azobis (2,4-dimethylvaleronitrile) were dissolved in 5 ml of dioxane was added to the resulting solution at 70° C. while stirring under nitrogen atmosphere, and reacted for 4 hours. The resulting reaction solution was cooled to room temperature, poured into 2 liters of ice water to produce precipitations, and the resulting precipitates were filtered off. Thus, polymer J was obtained. The molecular weight of polymer J was measured according to gel permeation chromatography, and the number average molecular weight of polymer J was 35,000. Polymer J was confirmed according to 1H-NMR to have 58 mol % of acryl monomer (p) unit.

EXAMPLES

The invention will be detailed according to the following examples, but is not limited thereto.

Example 1

<Samples 1 through 12>

(Preparation of Silicon Oxide Dispersion Solution)

| | |
|---|---|
| Aerosil 2000V (produced by Nihon Aerosil Co., Ltd.) (an average primary order particle size: 12 nm, and apparent gravity: 100 g/liter) | 10 weight parts |
| Ethanol | 90 weight parts |

The above composition was mixed with stirring in a dissolver for 30 minutes, and dispersed in a mantongorin to obtain a silicon oxide dispersion solution. Turbidity of the resulting dispersion solution was 93 ppm.

(Preparation of Solution A)

| | |
|---|---|
| Polymer A | 10 weight parts |
| Methylene chloride | 100 weight parts |

The above composition was incorporated in a sealed vessel, heated with stirring to obtain a solution. The resulting solution was filtered, and 10 weight parts of the above silicon oxide dispersion solution were added to the filtrate with stirring, stirred for additional three hours, and filtered. Thus, solution A was obtained.

(Dope A)

| | |
|---|---|
| Cellulose triacetate synthesized from cotton linter | 85 weight parts |
| Cellulose triacetate synthesized from tree pulp | 15 weight parts |
| Ethylphthalylethylglycolate | 2.5 weight parts |
| Triphenyl phosphate | 9 weight parts |
| Methylene chloride | 475 weight parts |
| Ethanol | 50 weight parts |

The above dope composition was incorporated in a sealed vessel, stirred while heating to obtain a solution, and the resulting solution was filtered to obtain dope A.

The weight parts as shown in Table 1 of solution A were added to 100 weight parts of dope A, uniformly mixed in an in-line mixer (a static in-line mixer Hi-Mixer SWJ, produced by Toray Co. Ltd.), and filtered. The resulting mixture was uniformly cast at 33° C. with a width of 1500 mm on a stainless steel belt to form a film, employing a belt casting apparatus. The cast film was evaporated until the residual solvent amount reached 25 percent, and peeled from the stainless steel belt at a peeling tension of 127 N (13 kgf)/m. The peeled cellulose triacetate film was slit in a width of 1300 mm, transported on many rollers in a dry zone to dry while being stretched by a factor of 1.03 in the width direction by means of a pin tenter, and further slit in a width of 1100 mm. Thus, cellulose triacetate film sample 1 was prepared. The thickness of sample 1 was 40 µm.

Cellulose triacetate film samples 2 through 12 were prepared in the same manner as in sample 1 above, except that the solutions as described below were added instead of solution A, and their weight parts added were changed to those as shown in Table 1.

(Solution B)

Solution B was prepared in the same manner as in solution A above, except that polymer B was used instead of polymer A.

(Solution C)

Solution C was prepared in the same manner as in solution A above, except that polymer C was used instead of polymer A.

(Solution D)

Solution D was prepared in the same manner as in solution A above, except that polymer D was used instead of polymer A.

(Solution E)

Solution E was prepared in the same manner as in solution A above, except that polymer E was used instead of polymer A.

(Solution F)

Solution F was prepared in the same manner as in solution A above, except that polymer F was used instead of polymer A.

(Solution G)

Solution G was prepared in the same manner as in solution A above, except that the following ultraviolet absorbent mixture was used instead of 10 weight parts of polymer A.

| | |
|---|---|
| Ultraviolet absorbent mixture | |
| TINUVIN 109 (produced by Ciba Speciality Chemicals Co. Ltd.) | 8 weight parts |
| Polymer G | 2 weight parts |

(Solution H)

Solution H was prepared in the same manner as in solution A above, except that the following ultraviolet absorbent mixture was used instead of 10 weight parts of polymer A.

| | |
|---|---|
| Ultraviolet absorbent mixture | |
| TINUVIN 109 (produced by Ciba Speciality Chemicals Co. Ltd.) | 5 weight parts |
| Polymer H | 5 weight parts |

(Solution I)

Solution I was prepared in the same manner as in solution A above, except that polymer I was used instead of polymer A.

(Solution J)

Solution J was prepared in the same manner as in solution A above, except that the following ultraviolet absorbent mixture was used instead of 10 weight parts of polymer A.

| | |
|---|---|
| Ultraviolet absorbent mixture | |
| TINUVIN 326 (produced by Ciba Speciality Chemicals Co. Ltd.) | 5 weight parts |
| TINUVIN 328 (produced by Ciba Speciality Chemicals Co. Ltd.) | 5 weight parts |

(Solution K)

Solution K was prepared in the same manner as in solution A above, except that polymer J was used instead of polymer A.

(Solution L)

Solution L was prepared in the same manner as in solution A above, except that polymer A was excluded.

(Evaluation)

(1) Roll Contamination

After 10,000 meters of each cellulose ester film sample were prepared, the first roller, which the film peeled from the stainless steel belt support firstly contacted, was visually observed for contamination. The evaluation criteria are as follows:

A: No contamination was observed on the roller surface.
B: Slight contamination was observed on a part of the roller surface.
C: Slight contamination was observed on the entire surface of the roller.
D: Apparent contamination was observed on the entire surface of the roller.

In the above evaluation, ranks A through C can continue production, but rank D requires suspension of production and cleaning of the roller.

(2) Transmittance

Absorption spectra of the film were measured employing a spectrophotometer U-3200 (produced by Hitachi Seisakusho Co., Ltd.), and transmittances at 500 nm and 380 nm were obtained. The evaluation criteria are as follows. Higher transmittance at 500 nm is more excellent, and lower transmittance at 380 nm is more excellent.:

(Transmittance at 500 nm)
A: Not less than 92%
B: 90% to less than 92%
C: 85% to less than 90%
D: Less than 85%

(Transmittance at 380 nm)
A: Less than 6%
B: 6% to less than 10%
C: 10% to less than 25%
D: Not less than 25%

(3) Haze

Haze was measured according to ASTM-D1003-52, employing a T-2600DA (produced by Tokyodenshokukogyo Co., Ltd.). The evaluation criteria are as follows:

A: Less than 0.2%
B: 0.2% to less than 1%
C: 1% to less than 5%
D: Not less than 5%

(4) Tear Strength

Tear strength of the film samples was measured according to the tear strength test (an Ermendorf tear method) of plastic films or sheets as defined in JIS-K7128-2.

(5) Dents

After 10,000 meters of each cellulose ester film sample were prepared, 1 m² of the film was sampled, and the number of dents with a size of not less than 30 μm on the surface of the sampled film was counted.

(Preparation of Polarizing Plate)

A 120 μm thick polyvinyl alcohol film was immersed in 100 kg of an aqueous solution containing 1 kg of iodine and 4 kg of boric acid, and stretched at 50° C. by a factor of six to obtain a polarizing film. Each of the cellulose ester film samples was adhered to both surfaces of the polarizing film employing an adhesive, an aqueous 5% completely saponified polyvinyl alcohol solution. Thus, polarizing plate samples were obtained.

(Preparation of Liquid Crystal Panel and Liquid Crystal Display Sample)

The polarizing plate of the display panel of a 15 type TFT type color liquid crystal display LA-1529HM (produced by NEC Co., Ldt.) was peeled. Subsequently, each of the polarizing plate samples was laminated on both sides of a liquid crystal cell so that the polarizing axis of the two polarizing plates was in accordance with the original polarizing axis and perpendicular to each other. The resulting laminate was installed in the 15 type TFT type color liquid crystal display to obtain a display sample for test.

A display sample installing a polarizing plate employing cellulose triacetate film sample 12 was compared with a display sample installing a polarizing plate employing another cellulose triacetate film sample. A "bicycle" image of SCID image (CD-ROM) produced by Nihon KikakuKyoukai) prepared based on the fine color standard digital image according to JIS-X-9021 was displayed on the panel of the displayed sample. The evaluation criteria are as follows:

(Image Quality)
A: Dissolving degree and sharpness are the same as those of a display sample containing film sample 12.
B: Dissolving degree and sharpness are a little inferior to those of a display sampling containing film sample 12.
C: Dissolving degree and sharpness are apparently inferior to those of a display sample containing film sample 12.
The results are shown in Table 1.

Example 2

An optical compensation film was prepared employing as a support the above obtained cellulose ester samples (samples 1 through 11).

(Preparation of Optical Compensation Film, Sample 2-1)

A 2% polyvinyl cinnamate methylethyl ketone solution was coated on one side of cellulose ester film sample 1, and irradiated with polarized ultraviolet light to form an oriented film. A coating solution, in which a slight amount of a photopolymerization initiator Irgacure 907 (produced by Ciba Geigy Co., Ltd.) and a sensitizer Kayacure DETX (produced by Nihon Kayaku Co., Ltd.) was dissolved in a methylethyl ketone solution containing 10% by weight of discotic liquid crystal compound ($\alpha$), was coated on the resulting oriented film at 1,000 rpm by means of a spin coater to form a liquid crystal layer. The surface of the support opposite the liquid crystal layer was brought into contact with a 95° C. metal roller for 40 seconds to orient the liquid crystal compound, the liquid crystal layer was irra-

TABLE 1

| Sample No. | Kinds of solution | Addition amount of solution (weight part) | Transmittance 500 nm | Transmittance 380 nm | Haze | Tear strengthg | Roller contamination | Dents number/m$^2$ | Image quality | Remarks |
|---|---|---|---|---|---|---|---|---|---|---|
| 1 | A | 2.0 | A | A | A | 6.5 | A | 3 | A | Inv. |
| 2 | B | 1.5 | A | A | A | 6.4 | A | 2 | A | Inv. |
| 3 | C | 2.0 | A | A | A | 6.5 | A | 4 | A | Inv. |
| 4 | D | 3.0 | A | A | A | 6.4 | A | 0 | A | Inv. |
| 5 | E | 1.5 | A | A | A | 6.5 | A | 3 | A | Inv. |
| 6 | F | 4.0 | A | A | A | 6.4 | A | 4 | A | Inv. |
| 7 | G | 0.5 | A | A | A | 6.6 | A | 2 | A | Inv. |
| 8 | H | 1.0 | A | A | A | 6.3 | A | 4 | A | Inv. |
| 9 | I | 2.0 | A | A | A | 6.2 | A | 1 | A | Inv. |
| 10 | J | 3.0 | A | A | A | 5.8 | D | 165 | C | Comp. |
| 11 | K | 4.0 | B | B | D | 6.3 | A | 5 | C | Comp. |
| 12 | L | 2.0 | A | D | A | 5.7 | A | 1 | A | Comp. |

Inv.: Invention, Comp.: Comparative

As is apparent from Table 1 above, the cellulose ester film of the invention containing the ultraviolet absorbent polymer in the invention provides extremely reduced haze, excellent tear strength and transmittance, and prevents roller contamination due to bleeding out phenomenon and dents.

diated at 95° C. for 2 minutes at an illuminance of 60 mW/cm$^2$ employing a 120 W/cm high pressure mercury lamp, and cooled to room temperature. Thus, optical compensation film, sample 2-1 comprising a liquid crystal layer was obtained.

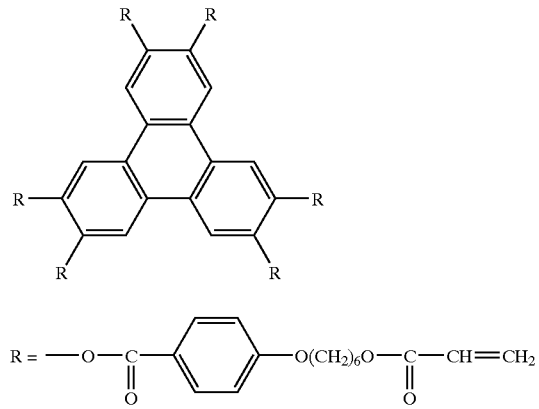

Discotic liquid crystal compound ($\alpha$)

Biaxial liquid crystal compound (β)

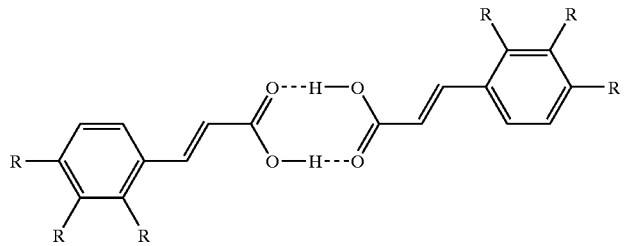

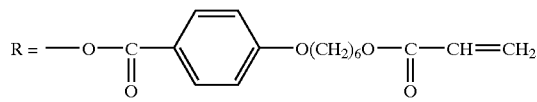

Rod-shaped liquid crystal compound (γ)

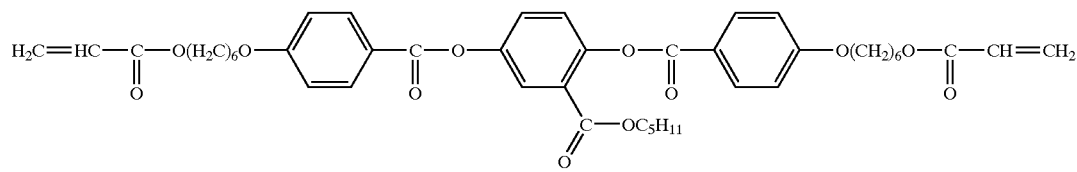

(Preparation of Sample 2-2)
Sample 2-2 was prepared in the same manner as in sample 2-1, except that cellulose ester film sample 1 was replaced with cellulose ester film sample 2.

(Preparation of Sample 2-3)
Sample 2-3 was prepared in the same manner as in sample 2-1, except that cellulose ester film sample 1 was replaced with cellulose ester film sample 3.

(Preparation of Sample 2-4)
Sample 2-4 was prepared in the same manner as in sample 2-1, except that cellulose ester film sample 1 was replaced with cellulose ester film sample 4, and discotic liquid crystal compound (α) was changed to biaxial liquid crystal compound (β).

(Preparation of Sample 2-5)
Sample 2-5 was prepared in the same manner as in sample 2-4, except that cellulose ester film sample 4 was replaced with cellulose ester film sample 5.

(Preparation of Sample 2-6)
Sample 2-6 was prepared in the same manner as in sample 2-4, except that cellulose ester film sample 4 was replaced with cellulose ester film sample 6.

(Preparation of Sample 2-7)
Sample 2-7 was prepared in the same manner as in sample 2-1, except that cellulose ester film sample 1 was replaced with cellulose ester film sample 7, and discotic liquid crystal compound (α) was changed to rod-shaped liquid crystal compound (γ)

(Preparation of Sample 2-8)
Sample 2-8 was prepared in the same manner as in sample 2-7, except that cellulose ester film sample 7 was replaced with cellulose ester film sample 8.

(Preparation of Sample 2-9)
Sample 2-9 was prepared in the same manner as in sample 2-7, except that cellulose ester film sample 7 was replaced with cellulose ester film sample 9.

(Preparation of Sample 2-10)
Sample 2-10 was prepared in the same manner as in sample 2-1, except that cellulose ester film sample 1 was replaced with cellulose ester film sample 10.

(Preparation of Sample 2-11)
Sample 2-11 was prepared in the same manner as in sample 2-4, except that cellulose ester film sample 4 was replaced with cellulose ester film sample 11.

Each of the above obtained samples was visually evaluated for orientation disorder of the liquid crystal compound, employing two polarizing plates arranged each other at right angle. The evaluation criteria are as follows:

A: No orientation disorder of the liquid crystal compound was observed.
B: Only a slight orientation disorder of the liquid crystal compound was observed.
C: Orientation disorder of the liquid crystal compound was observed.
D: Orientation of the liquid crystal compound was not observed.

The results are shown in Table 2.

TABLE 2

| Sample No. | Liquid crystal compound | Orientation disorder | Remarks |
|---|---|---|---|
| 2-1 | Discotic liquid crystal compound (α) | A | Inv. |
| 2-2 | Discotic liquid crystal compound (α) | A | Inv. |
| 2-3 | Discotic liquid crystal compound (α) | A | Inv. |
| 2-4 | Biaxial liquid crystal compound (β) | A | Inv. |
| 2-5 | Biaxial liquid crystal compound (β) | A | Inv. |
| 2-6 | Biaxial liquid crystal compound (β) | A | Inv. |
| 2-7 | Rod-shaped liquid crystal compound (γ) | A | Inv. |
| 2-8 | Rod-shaped liquid crystal compound (γ) | A | Inv. |
| 2-9 | Rod-shaped liquid crystal compound (γ) | A | Inv. |
| 2-10 | Discotic liquid crystal compound (α) | D | Comp. |

TABLE 2-continued

| Sample No. | Liquid crystal compound | Orientation disorder | Remarks |
|---|---|---|---|
| 2-11 | Biaxial liquid crystal compound (β) | C | Comp. |

Inv.: Invention,
Comp.: Comparative,

As is apparent from Table 2 above, the optical compensation film containing the cellulose ester film of the invention does not produce orientation disorder, which has been a problem, and orientation of the liquid crystal compound is maintained even if it is a discotic liquid crystal compound, a biaxial liquid crystal compound or a rod-shaped liquid crystal compound.

Example 3

The term "parts" herein after referred to is parts by weight.

Synthesis Examples

Synthesis examples of ultraviolet absorbent copolymers used in the invention will be shown below.

Synthesis Example 1, Synthesis of UVM-1

UVM-1 was prepared according to the following procedures:

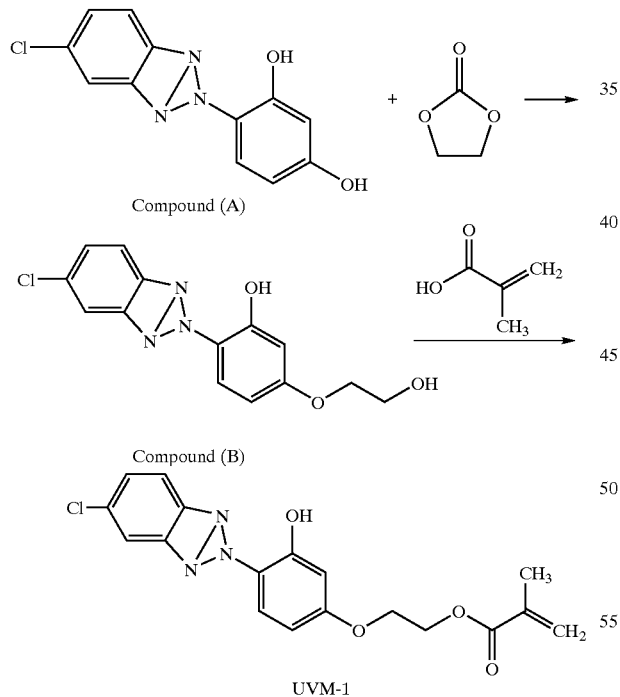

Synthesis of Compound (B)

A mixture of 130.5 g of compound (A), 49.5 g of ethylene carbonate and 1.4 g of tetramethylammonium chloride was heat fused at 140° C. under nitrogen atmosphere, and heated at 150° C. for 8 hours. The mixture was cooled to 110° C. and 150 ml of water were added thereto with stirring to produce precipitates. The resulting precipitates were filtered off, dried, and recrystallized from acetone to obtain 103.0 g of compound (B). The chemical structure of compound (B) was confirmed according to NMR and mass spectroscopy.

Synthesis of UVM-1

Compound (B) of 61.0 g. 18.7 ml of methacrylic acid, 0.8 g of hydroquinone and 1.0 g of p-toluene sulfonic acid were added to 600 ml of toluene, and heated under reflux with stirring while removing the produced water. After the reaction, the toluene was evaporated under reduced pressure, and the resulting residue was recrystallized from ethyl acetate to obtain 58.6 g of UVM-1. The chemical structure of UVM-1 was confirmed according to NMR and mass spectroscopy.

Synthesis Example 2, Polymerization of UVM-1 and Methyl Methacrylate

Polymerization of UVM-1 and methyl methacrylate was carried out according to the following procedures:

Polymerization Example 11

Methyl methacrylate of 4.0 g, 5.0 g of UVM-1, and 0.88 g of azobisisobutyronitrile were added to 50 ml of tetrahydrofuran, and polymerized at 70° C. for 9 hours under nitrogen atmosphere. After the polymerization, the tetrahydrofuran was evaporated under reduced pressure. The resulting residue was re-dissolved in 15 ml of tetrahydrofuran and poured into a large amount of methyl alcohol. The resulting precipitates were filtered off, and dried in vacuo at 40° C. to obtain 7.2 g of gray powdered polymer. The weight average molecular weight of the polymer was 12000 in terms of standard polystyrene according to GPC analysis. The chemical structure of polymer was confirmed to be a copolymer of UVM-1 and methyl methacrylate according to NMR and mass spectroscopy. The UVM-1 content of the polymer was 55 weight %.

Polymerization Example 12

Methyl methacrylate of 6.4 g, 3.0 g of UVM-1, and 1.18 g of azobisisobutyronitrile were added to 50 ml of tetrahydrofuran, and polymerized at 70° C. for 8 hours under nitrogen atmosphere. After the polymerization, the tetrahydrofuran was evaporated under reduced pressure. The resulting residue was re-dissolved in 10 ml of tetrahydrofuran and poured into a large amount of methyl alcohol. The resulting precipitates were filtered off, and dried in vacuo at 40° C. to obtain 8.0 g of gray powdered polymer. The weight average molecular weight of the polymer was 8000 in terms of standard polystyrene according to GPC analysis. The chemical structure of polymer was confirmed to be a copolymer of UVM-1 and methyl methacrylate according to NMR and mass spectroscopy. The UVM-1 content of the polymer was 33 weight %.

Polymerization Example 13

Methyl methacrylate of 4.0 g, 5.0 g of UVM-1, and 0.88 g of azobisisobutyronitrile were added to 50 ml of ethyl acetate, and polymerized at 70° C. for 8 hours under nitrogen atmosphere. After the polymerization, the ethyl acetate was evaporated under reduced pressure. The resulting residue was re-dissolved in 10 ml of tetrahydrofuran and poured into a large amount of methyl alcohol. The resulting precipitates were filtered off, and dried in vacuo at 40° C. to obtain 6.6 g of gray powdered polymer. The weight average molecular weight of the polymer was 6000 in terms of standard polystyrene according to GPC analysis. The chemical structure of polymer was confirmed to be a copolymer of UVM-1 and methyl methacrylate according to NMR and mass spectroscopy. The UVM-1 content of the polymer was 61 weight %.

The other ultraviolet absorbent monomer or copolymer can be synthesized the same procedures as above or procedures described in known literatures.

The data of extinction coefficient of ultraviolet absorbent monomers used in the invention are shown in Table 3.

Spectral Characteristics of Ultraviolet Absorbent Monomers

TABLE 3

| Monomers | $\epsilon$(380 nm) | $\epsilon$(380 nm)/$\epsilon$(400 nm) |
|---|---|---|
| UVM-1 | 6600 | Not less than 50 |
| UVM-2 | 7900 | Not less than 50 |
| UVM-5 | 10000 | 37 |
| UVM-7 | 11000 | 50 |
| UVM-11 | 6000 | Not less than 50 |
| UVM-20 | 7000 | 10 |

In Table 3, $\epsilon$(380 nm) represents a molecular extinction coefficient at 380 nm, and $\epsilon$(380 nm)/$\epsilon$(400 nm) represents a ratio of molecular extinction coefficient at 400 nm to molecular extinction coefficient at 380 nm. The molecular extinction coefficient was measured employing methylene chloride.

The weight average molecular weight of the ultraviolet absorbent copolymers in the invention used in the following examples and the ultraviolet absorbent monomer content of the copolymers are shown in Table 4.

TABLE 4

| UV polymer | UV monomer | Comonomer | Weight average molecular weight | UV monomer content in the copolymer (weight %) | Remarks |
|---|---|---|---|---|---|
| UVP-1 | UVM-1 | MNA | 12000 | 55 | Invention |
| UVP-2 | UVM-1 | MMA | 8000 | 33 | Invention |
| UVP-3 | UVM-1 | MMA | 6000 | 61 | Invention |
| UVP-4 | UVM-1 | HPMA | 8300 | 32 | Invention |
| UVP-5 | UVM-1 | THFA | 7600 | 42 | Invention |
| UVP-6 | UVM-1 | EEA | 6400 | 43 | Invention |
| UVP-7 | UVM-2 | MMA | 12000 | 54 | Invention |
| UVP-8 | UVM-2 | MMA | 11000 | 32 | Invention |
| UVP-9 | UVM-2 | MMA | 8000 | 45 | Invention |
| UVP-10 | UVM-5 | MNA | 8400 | 50 | Invention |
| UVP-11 | UVM-7 | MMA | 7800 | 48 | Invention |
| UVP-12 | UVM-11 | MMA | 11000 | 29 | Invention |
| UVP-13 | UVM-20 | MMA | 12000 | 32 | Invention |

In Table 4, UV monomer represents an inventive ultraviolet absorbent monomer, and the comonomer represents a monomer to be copolymerized with the ultraviolet absorbent monomer.

In Table 4, MMA represents methyl methacrylate, HPMA represents 2-hydroxypropyl methacrylate, THFA represents tetrafurfuryl acrylate, and EEA represents 2-ethoxyethyl acrylate.

In Table 4, the weight average molecular weight was obtained in terms of standard polystyrene according to GPC analysis. In the UV content the ultraviolet absorbent unit content in the ultraviolet absorbent polymer was represented by weight %.

Example 3-1

<Samples 101 through 113>

(Preparation of Silicon Oxide Dispersion Solution)

| | |
|---|---|
| Aerosil 2000V | 10 parts |
| (produced by Nihon Aerosil Co., Ltd.) | |
| (an average primary order particle size: 12 nm, and apparent gravity: 100 g/liter) | |
| Ethanol | 90 parts |

The above composition was mixed with stirring in a dissolver for 30 minutes, and dispersed in a mantongorin to obtain a silicon oxide dispersion solution. Turbidity of the resulting dispersion solution was 93 ppm.

(Preparation of Solution A-1)

| | |
|---|---|
| Ultraviolet absorbent polymer UVP-1 (Table 5) | 10 parts |
| Methylene chloride | 100 parts |

The above composition was incorporated in a sealed vessel, heated with stirring to obtain a solution. The resulting solution was filtered, and 10 weight parts of the above silicon oxide dispersion solution were added to the filtrate with stirring, stirred for additional three hours, and filtered. Thus, solution A-1 was obtained.

(Dope A-1)

| | |
|---|---|
| Cellulose triacetate synthesized from cotton linter | 85 parts |
| Cellulose triacetate synthesized from tree pulp | 15 parts |
| Polyester (Mw = 600) of adipic acid and 1.3-butylene glycol | 11.5 parts |
| Methylene chloride | 475 parts |
| Ethanol | 50 parts |

The above dope composition was incorporated in a sealed vessel, stirred while heating to obtain a solution, and the resulting solution was filtered to obtain dope A-1.

(Film Preparation)

Solution A-1 was added to 100 parts of dope A-1 to give parts as shown in Table 5 of ultraviolet absorbent polymer UVP-1, uniformly mixed in an in-line mixer (a static in-line mixer Hi-Mixer SWJ, produced by Toray Co. Ltd.), and filtered. The resulting mixture was uniformly cast at 33° C. with a width of 1500 mm on a stainless steel belt to form a film, employing a belt casting apparatus. The cast film was evaporated until the residual solvent amount reached 100 percent, and peeled from the stainless steel belt at a peeling tension of 127 N/m. The peeled cellulose triacetate film was slit in a width of 1300 mm, transported on many rollers in a dry zone to dry while being stretched by a factor of 1.05 in the width direction by means of a pin tenter, and further slit in a width of 1100 mm. Thus, cellulose triacetate film sample 101 was prepared. The thickness of sample 101 was 40 μm.

Cellulose triacetate film samples 102 through 113 were prepared in the same manner as in sample 101 above, except that the ultraviolet absorbent polymers as shown in Table 5 were added instead of ultraviolet absorbent polymer UVP-1 in solution A-1, and their parts added were changed to those as shown in Table 5.

(Evaluation)

The resulting samples were evaluated according to the following:

Samples having a haze of not more than 1.0% were evaluated for YI, Ro, Rt, luminescent spots, and durability. The results are shown in Table 5.

(Measurement Method)

UV Property

Absorption spectra of the film were measured employing a spectrophotometer U-3200 (produced by Hitachi Seisakusho Co., Ltd.), and transmittances at 500 nm and 380 nm were obtained. The evaluation criteria are as follows:

(Transmittance at 500 nm)
A: Not less than 92%
B: 90% to less than 92%
C: 85% to less than 90%
D: Less than 85%

(Transmittance at 380 nm)
A: Less than 6%
B: 6% to less than 10%
C: 10% to less than 25%
D: Not less than 25%

In the above evaluation, higher transmittance at 500 nm is more excellent, and lower transmittance at 380 nm is more excellent.

Haze (Value of One Sheet)

Haze of one sheet of the samples was measured according to ASTM-D1003-52, employing a T-2600DA (produced by Tokyodenshokukogyo Co., Ltd.).

(Value of Three Sheets)

Three sheets of samples having a one sheet haze value of 0.0% were laminated and the haze of the laminate was measured according to ASTM-D1003-52, employing a T-2600DA (produced by Tokyodenshokukogyo Co., Ltd.).

YI

YI (Yellowness index, yellowing index) of the sample as defined in JIS K7103 were obtained from the following formula, employing a spectrophotometer U-3200 (produced by Hitachi Seisakusho Co., Ltd.).

$$YI=100 (1.28X-1.06Z)/Y$$

Wherein X, Y and Z represent spectral tristimulus values of light source according to JIS Z8701.

A: less than 1.0
B: 1.0 to less than 1.5
C: not less than 1.5

Luminescent Spots

Each sample was placed between two polarizing plates arranged at right angle to each other, and the number per 25 $mm^2$ of luminescent spots (white spots) was determined at 100 areas employing a microscope, and the average was obtained. At that time, a transmission light source and a magnifying factor of 30 were employed as conditions using a microscope. Less luminescent spots provide better properties.

Durability

Each sample, after stored at 80° C. and 90% RH for 1000 hours, was evaluated for bleed out and YI.

(Bleed Out)

Bleed out on the surface of the resulting sample was observed, and evaluated according to the following criteria:

A: No bleed out was observed on the surface of the sample.
B: Slight bleed out was observed on a part of the surface of the sample.
C: Slight bleed out was observed on the entire surface of the sample.
D: Apparent bleed out was observed on the entire surface of the sample.

In the above evaluation, ranks A through C can continue production, but rank D requires suspension of production and cleaning of the roller.

(Difference of YI)

The resulting sample was evaluated for YI in the same manner as above, and difference of YI between samples before and after storage was determined and evaluated according to the following criteria. Less difference provides more excellent property.

A: Difference of less than 0.3
B: Difference of 0.3 to less than 0.6
C: Difference of 0.6 to less than 1.0
D: Difference of not less than 1.0

TABLE 5

| Sample No. | Ultra-violet absorbent polymer | Addition amount (weight parts) | UV property | | Haze (%) | | | | | Luminescent spots (number/ 25 $mm^2$) | Durability | |
|---|---|---|---|---|---|---|---|---|---|---|---|---|
| | | | Trans-mission at 500 nm | Trans-mission at 380 nm | One sheet value | Three sheet value | YI | $R_o$ | $R_t$ | | Bleed out | YI variation |
| 101 | UVP-1 | 8.0 | A | B | 0.0 | 0.5 | A | 0.3 | 35.1 | 5.8 | A | B |
| 102 | UVP-2 | 12.0 | A | B | 0.0 | 0.4 | A | 0.4 | 34.3 | 6.5 | A | B |
| 103 | UVP-3 | 8.0 | A | B | 0.0 | 0.2 | A | 0.4 | 36.8 | 5.8 | A | B |
| 104 | UVP-4 | 12.0 | A | B | 0.0 | 0.2 | A | 0.5 | 35.2 | 6.7 | A | B |
| 105 | UVP-5 | 10.0 | A | B | 0.0 | 0.2 | A | 0.2 | 33.1 | 4.8 | A | B |
| 106 | UVP-6 | 10.0 | A | B | 0.0 | 0.3 | A | 0.5 | 30.5 | 6.8 | A | B |
| 107 | UVP-7 | 8.0 | A | A | 0.0 | 0.5 | A | 0.2 | 35.7 | 5.6 | A | B |
| 108 | UVP-8 | 12.0 | A | A | 0.0 | 0.5 | A | 0.3 | 30.4 | 5.9 | A | B |
| 109 | UVP-9 | 8.0 | A | A | 0.0 | 0.5 | A | 0.3 | 28.9 | 5.1 | A | B |
| 110 | UVP-10 | 6.0 | A | A | 0.0 | 0.5 | A | 0.3 | 30.6 | 2.5 | A | A |
| 111 | UVP-11 | 6.0 | A | A | 0.0 | 0.5 | A | 0.4 | 30.4 | 2.8 | A | A |
| 112 | UVP-12 | 14.0 | A | B | 0.0 | 0.5 | A | 0.2 | 33.8 | 4.8 | A | B |
| 113 | UVP-13 | 12.0 | A | B | 0.0 | 0.5 | B | 0.5 | 31.2 | 5.9 | A | B |

As is apparent from Table 5 above, samples employing the ultraviolet absorbent copolymer in the invention can be suitably put into practical use as a polarizing plate. That is, inventive samples provide a sufficient ultraviolet absorption property, minimizes haze, an excellent transparency, and an excellent weather-proof without evaporation, bleed out or crystallization of chemicals, and are suitably used as optical films. Further, it is apparent that inventive samples provide excellent effects when applied to a polarizing plate or a liquid crystal display.

Samples 101 through 113 were subjected to the following alkali saponification treatment, and employed for preparation of a polarizing plate and a liquid crystal display panel. The resulting products were irradiated at illuminance of 70000 lux for 500 hours employing a xenon long life weather meter, and evaluated for light fastness.

(Light Fastness)

(Alkali Saponification)

| Saponification | 2 mol/liter NaOH | 50° C. | 90 seconds |
| Washing | Water | 30° C. | 45 seconds |
| Neutralizing | 10% by weight HCl | 30° C. | 45 seconds |
| Washing | Water | 30° C. | 45 seconds |

The samples were saponified, washed, neutralized, and washed in that order according to the above procedures, and dried at 80° C.

(Preparation of Polarizing Plate)

A 120 μm thick polyvinyl alcohol film was immersed in 100 kg of an aqueous solution containing 1 kg of iodine and 4 kg of boric acid, and stretched at 50° C. by a factor of six to obtain a polarizing film. Each of the cellulose ester film samples was adhered to both surfaces of the polarizing film employing an adhesive, an aqueous 5% completely saponified polyvinyl alcohol solution. Thus, polarizing plate samples were obtained.

(Preparation of Liquid Crystal Panel and Liquid Crystal Display Sample)

The polarizing plate of the display panel of a 15 type TFT type color liquid crystal display LA-1529HM (produced by NEC Co., Ltd.) was peeled. Subsequently, each of the polarizing plate samples was laminated on both sides of a liquid crystal cell so that the polarizing axis of the two polarizing plates was in accordance with the original polarizing axis and perpendicular to each other. The resulting laminate was installed in the 15 type TFT type color liquid crystal display to obtain a display sample for test.

In the liquid crystal panel prepared employing samples 101 through 113, there was no difference between resolution degree and sharpness of displayed images before irradiation and those after irradiation.

Disclosed embodiment can be varied by a skilled person without departing from the spirit and scope of the invention.

What is claimed is:

1. A cellulose ester film comprising (a) an ultraviolet absorbent polymer having at least one of repeating units represented by the following formulae (1) and (2) and repeating units having ultraviolet absorbent structures represented by the following formulae (3), (4) and (5), (b) an ultraviolet absorbent polymer which is a copolymer of a repeating unit represented by the following formula (6), (7) or (19) with a monomer unit derived from another ethylenically unsaturated monomer, (c) an ultraviolet absorbent polymer which is a copolymer of a monomer represented by the following formula (8) with a monomer represented by the following formula (9), or (d) modified cellulose in which an ultraviolet absorbent structure bonds directly or through a spacer to a hydroxy group of cellulose or its derivative:

formula (1)

wherein $J_1$ represents —O—, —$NR_1$—, —S—, —SO—, —$SO_2$—, —POO—, —CO—, —COO—, —$NR_2$CO—, —$NR_3$COO—, —$NR_4$CONR$_5$—, —OCO—, —OCONR$_6$—, —CONR$_7$—, —$NR_8$SO—, —$NR_9$SO$_2$—, —SONR$_{10}$—, or —SO$_2$NR$_{11}$—, in which $R_1$ through $R_{11}$ independently represent a hydrogen atom, a substituted or unsubstituted alkyl group or a substituted or unsubstituted aryl group; and $Sp_1$ represents a divalent linkage which may have a halogen atom, an alkyl group, an aryl group, an acyl group, a sulfonyl group, an alkoxy group, an aryloxy group, an alkylthio group, an arylthio group, an amino group, an alkylamino group, an arylamino group, an acylamino group, a hydroxy group, a cyano group, a carbamoyl group, a sulfamoyl group, a sulfonamido group, an acyloxy group, an oxycarbonyl group, a sulfonylamino group, a ureido group, a sulfamoylamino group, an alkoxycarbonyl group, an aryloxycarbonyl group, a nitro group, an imido group, or a heterocyclic group, provided that an ultraviolet absorbent structure bonds directly or through a spacer to $Sp_1$ or forms a part of the polymer main chain, formula (2)

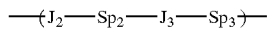

wherein $J_2$ and $J_3$ represent the same group as $J_1$ denoted in formula (1) above, and may be the same or different; $Sp_2$ and $Sp_3$ independently represent a divalent linkage which may have a halogen atom, an alkyl group, an aryl group, an acyl group, a sulfonyl group, an alkoxy group, an aryloxy group, an alkylthio group, an arylthio group, an amino group, an alkylamino group, an arylamino group, an acylamino group, a hydroxy group, a cyano group, a carbamoyl group, a sulfamoyl group, a sulfonamido group, an acyloxy group, an oxycarbonyl group, a sulfonylamino group, a ureido group, a sulfamoylamino group, an alkoxycarbonyl group, an aryloxycarbonyl group, a nitro group, an imido group, or a heterocyclic group, and may be the same or different, provided that an ultraviolet absorbent structure bonds directly or through a spacer to at least one of $Sp_2$ and $Sp_3$ or forms a part of the polymer main chain in at least one of $Sp_2$ and $Sp_3$, formula (3)

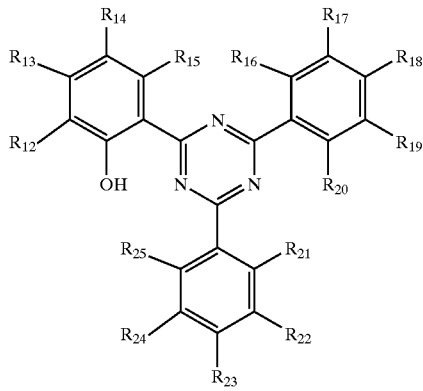

wherein $R_{12}$ through $R_{25}$ independently represent a hydrogen atom, a halogen atom, an alkyl group, an aryl group, an acyl group, a sulfonyl group, an alkoxy group, an aryloxy group, an alklthio group, an arylthio group, an amino group, an alkylamino group, an arylamino group, an acylamino group, a hydroxy group, a cyano group, a carbamoyl group, a sulfamoyl group, a sulfonamido group, an acyloxy group, an oxycarbonyl group, a sulfonylamino group, a ureido group, a sulfamoylamino group, an alkoxycarbonyl group, an aryloxycarbonyl group, a nitro group, an imido group, or a heterocyclic group, provided that the two adjacent groups of $R_{12}$ through $R_{25}$ may combine with each other to form a ring, and provided that the ultraviolet absorbent structure of formula (3) bonds directly or through a spacer to the polymer main chain or forms a part of the polymer main chain, formula (4)

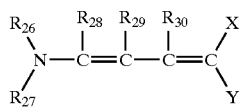

wherein $R_{26}$ and $R_{27}$ independently represent an alkyl group having a carbon atom number of 1 to 10; $R_{28}$, $R_{29}$ and $R_{30}$ independently represent a substituted or unsubstituted alkyl group, a substituted or unsubstituted alkoxy group, a substituted or unsubstituted alkylthio group or a substituted or unsubstituted amino group; X and Y independently represent an electron withdrawing group, provided that X and Y may have a halogen atom, an alkyl group, an aryl group, an acyl group, a sulfonyl group, an alkoxy group, an aryloxy group, an alkylthio group, an arylthio group, an amino group, an alkylamino group, an arylamino group, an acylamino group, a hydroxy group, a cyano group, a carbamoyl group, a sulfamoyl group, a sulfonamido group, an acyloxy group, an oxycarbonyl group, a sulfonylamino group, a ureido group, a sulfamoylamino group, an alkoxycarbonyl group, an aryloxycarbonyl group, a nitro group, an imido group, or a heterocyclic group, or may combine with another to form a 5- or 6-member ring, and provided that the ultraviolet absorbent structure of formula (4) bonds directly or through a spacer to the polymer main chain or forms a part of the polymer main chain, formula (5)

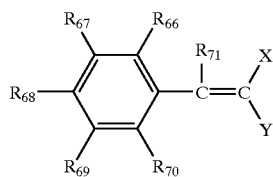

wherein $R_{66}$ through $R_{70}$ independently represent a hydrogen atom, a halogen atom, an alkyl group, an alkoxy group, or an alkylamino group, and $R_{71}$ represents a hydroxy group, a halogen atom or an alkyl group, provided that the two adjacent groups of $R_{66}$ through $R_{71}$ may combine with each other to form a ring; X and Y independently represent an electron withdrawing group, provided that X and Y may have a halogen atom, an alkyl group, an aryl group, an acyl group, a sulfonyl group, an alkoxy group, an aryloxy group, an alkylthio group, an arylthio group, an amino group, an alkylamino group, an arylamino group, an acylamino group, a hydroxy group, a cyano group, a carbamoyl group, a sulfamoyl group, a sulfonamido group, an acyloxy group, an oxycarbonyl group, a sulfonylamino, a ureido group, a sulfamoylamino group, an alkoycarbonyl group, an aryloxycarbonyl group, a nitro group, an imido group, or a hetero-cyclic group, but do not combine with each other to form a ring; and provided that the ultraviolet absorbent structure of formula (5) bonds directly or through a spacer to the polymer main chain or forms a part of the polymer main chain, formula (6)

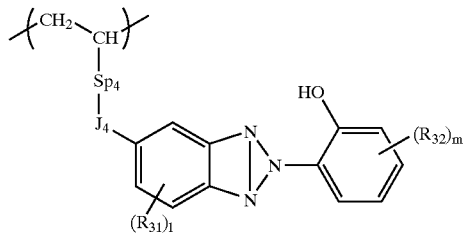

wherein $R_{31}$ and $R_{32}$ independently represent a halogen atom, an alkyl group, an aryl group, an acyl group, a sulfonyl group, an alkoxy group, an aryloxy group, an alkylthio group, an arylthio group, an amino group, an alkylamino group, an arylamino group, an acylamino group, a hydroxy group, a cyano group, a carbamoyl group, a sulfamoyl group, a sulfonamido group, an acyloxy group, an oxycarbonyl group, a sulfonylamino group, a ureido group, a sulfamoylamino group, an alkoxycarbonyl group, an aryloxycarbonyl group, a nitro group, an imido group, or a heterocyclic group; l represents 0, 1, 2, or 3, provided that when l is 2 or 3, plural $R_{31}$s may be the same or different; m represents 0, 1, 2, 3, or 4, provided that when m is 2, 3 or 4, plural $R_{32}$s may be the same or different; $J_4$ represents a group selected from *—O—, *—$NR_1$—, *—S—, *—SO—, *—$SO_2$—, *—POO—, *—CO—, *—COO—, *—$NR_2$CO—, *—$NR_3$COO—, *—$NR_4$CONR$_5$—, *—OCO—, *—OCONR$_6$—, *—CONR$_7$—, *—$NR_8$SO—, *—$NR_9SO_2$—, *—SONR$_{10}$—, *—$SO_2NR_{11}$— or *—OCOR$_{12}$—, in which symbol "*" represents that the group bonds to the ultraviolet absorbent structure at the position "*" (on the side of $J_4$ opposite $Sp_4$) and $R_1$ through $R_{12}$ independently represent the same as $R_1$ through $R_{11}$ denoted in formula (1) above; and $Sp_4$ represents a divalent linkage which may have a halogen atom, an alkyl group, an aryl group, an acyl group, a sulfonyl group, an alkoxy group, an aryloxy group, an alkylthio group, an arylthio group, an amino group, an alkylamino group, an arylamino group, an acylamino group, a hydroxy group, a cyano group, a carbamoyl group, a sulfamoyl group, a sulfonamido group, an acyloxy group, an oxycarbonyl group, a sulfonylamino group, a ureido group, a sulfamoylamino group, an alkoxycarbonyl group, an aryloxycarbonyl group, a nitro group, an imido group, or a heterocyclic group, formula (7)

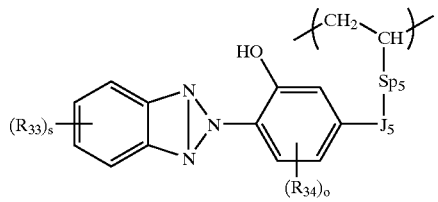

wherein $R_{33}$ and $R_{34}$ independently represent a halogen atom, an alkyl group, an aryl group, an acyl group, a sulfonyl group, an alkoxy group, an aryloxy group, an alkylthio group, an arylthio group, an amino group, an alkylamino group, an arylamino group, an acylamino group, a hydroxy group, a cyano group, a carbamoyl group, a sulfamoyl group, a sulfonamido group, an acyloxy group, an oxycarbonyl group, a sulfonylamino group, a ureido group, a sulfamoylamino group, an alkoxycarbonyl group, an aryloxycarbonyl group, a nitro group, an imido group, or a heterocyclic group; o represents 0, 1, 2 or 3, provided that when o is 2 or 3, plural $R_{34}$s may be the same or different; s represents 0, 1, 2, 3 or 4, provided that when s is 2, 3 or 4, plural $R_{33}$s are the same or different; $J_5$ represents a group selected from *—O—, *—$NR_1$—, *—S—, *—SO—, *—$SO_2$—, *—POO—, *—CO—, *—COO—, *—$NR_2$CO—, *—$NR_3$COO—, *—$NR_4CONR_5$—, *—OCO—, *—$OCONR_6$—, *—$CONR_7$—, *—$NR_8$SO—, *—$NR_9SO_2$—, *—$SONR_{10}$—, *—$SO_2NR_{11}$— or *—$OCOR_{12}$, in which symbol "*" represents that the group bonds to the ultraviolet absorbent group at the position "*" (on the side of $J_5$ opposite $Sp_5$) and $R_1$ through $R_{12}$ independently represent the same as $R_1$ through $R_{11}$ denoted in formula (1) above; and $Sp_5$ represents a divalent linkage which may have a halogen group, an alkyl group, an aryl group, an acyl group, a sulfonyl group, an alkoxy group, an aryloxy group, an alkylthio group, an arylthio group, an amino group, an alkylamino group, an arylamino group, an acylamino group, a hydroxy group, a cyano group, a carbamoyl group, a sulfamoyl group, a sulfonamido group, an acyloxy group, an oxycarbonyl group, a sulfonylamino group, a ureido group, a sulfamoylamino group, an alkoxycarbonyl group, an aryloxycarbonyl group, a nitro group, an imido group, or a heterocyclic group,

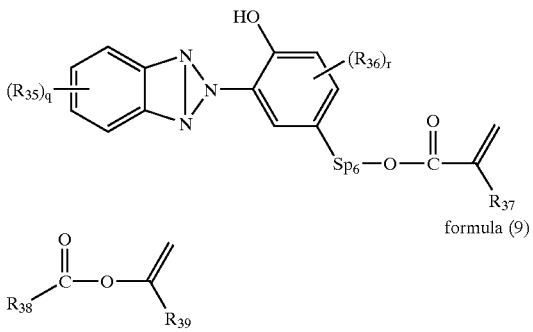

formula (8)

formula (9)

wherein $R_{35}$ through $R_{36}$ independently represent a halogen atom, an alkyl group, an aryl group, an acyl group, a sulfonyl group, an alkoxy group, an aryloxy group, an alkylthio group, an arylthio group, an amino group, an alkylamino group, an arylamino group, an acylamino group, a hydroxy group, a cyano group, a carbamoyl group, a sulfamoyl group, a sulfonamido group, an acyloxy group, an oxycarbonyl group, a sulfonylamino group, a ureido group, a sulfamoylamino group, an alkoxycarbonyl group, an aryloxycarbonyl group, a nitro group, an imido group, or a heterocyclic group; r represents 0, 1, 2 or 3, provided that when r is 2 or 3, plural $R_{36}$s are the same or different; q represents 0, 1, 2, 3 or 4, provided that when q is 2, 3 or 4, plural $R_{35}$s may be the same or different; $R_{37}$ through $R_{39}$ independently represent a hydrogen atom, a halogen atom, an alkyl group, an aryl group, an acyl group, a sulfonyl group, an alkoxy group, an aryloxy group, an alkylthio group, an arylthio group, an amino group, an alkylamino group, an arylamino group, an acylamino group, a hydroxy group, a cyano group, a carbamoyl group, a sulfamoyl group, a sulfonamido group, an acyloxy group, an oxycarbonyl group, a sulfonylamino group, a ureido group, a sulfamoylamino group, an alkoxycarbonyl group, an aryloxycarbonyl group, a nitro group, an imido group, or a heterocyclic group; and $Sp_6$ represents a divalent linkage which may have a halogen atom, an alkyl group, an aryl group, an acyl group, a sulfonyl group, an alkoxy group, an aryloxy group, an alkylthio group, an arylthio group, an amino group, an alkylamino group, an arylamino group, an acylamino group, a hydroxy group, a cyano group, a carbamoyl group, a sulfamoyl group, a sulfonamido group, an acyloxy group, an oxycarbonyl group, a sulfonylamino group, a ureido group, a sulfamoylamino group, an alkoxycarbonyl group, an aryloxycarbonyl group, a nitro group, an imido group, or a heterocyclic group,

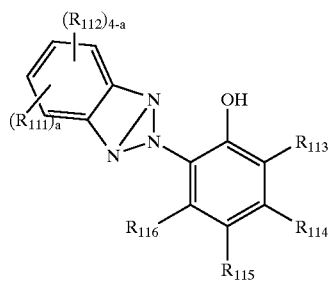

formula (19)

wherein $R_{111}$ represents a halogen atom, a hydroxy group, an alkoxy group, an aryloxy group, a heterocyclicoxy group, a carbonyloxy group, a urethan group, a sulfonyloxy group, a nitro group, an amino group, a sulfonylamino group, a sulfamoylamino group, an acylamino group, a ureido group, an alkylthio group, an arylthio group, a heterocyclicthio group, a sulfinyl group, a sulfonyl group, or a sulfamoyl group; $R_{112}$ represents a hydrogen atom, a substituted or unsubstituted aliphatic group, a substituted or unsubstituted aromatic hydrocarbon group or a substituted or unsubstituted heterocyclic group; a represents an integer of from 1 to 4, provided that plural $R_{111}$s or plural $R_{112}$s may be the same or different; $R_{113}$, $R_{115}$, and $R_{116}$ independently represent a hydrogen atom, a substituted or unsubstituted aliphatic group, a substituted or unsubstituted aromatic hydrocarbon group or a substituted or unsubstituted heterocyclic group; $R_{114}$ represents a hydroxy group, an alkoxy group, an aryloxy group, a heterocyclicoxy group, a carbonyloxy group, a urethan group, a sulfonyloxy group, a nitro group, an amino group, a sulfonylamino group, a sulfamoylamino group, an acylamino group, a ureido group; and at least one of $R_{111}$ through $R_{116}$ has a group represented by the following formula (20),

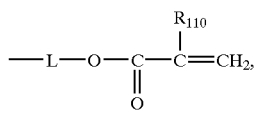

formula (20)

wherein L represents a divalent linkage or a simple bond; and $R_{110}$ represents a hydrogen atom or a substituted or unsubstituted alkyl group.

2. The cellulose ester film of claim 1, wherein the cellulose ester film has a transmittance at 380 nm of 0 to 10%.

3. The cellulose ester film of claim 1, wherein the cellulose ester film has a haze of 0 to 0.5.

4. The cellulose ester film of claim 1, wherein the ultraviolet absorbent polymer is a copolymer of the repeating unit represented by formula (1), (2), (6), (7) or (19) or a repeating unit having an ultraviolet absorbent structure represented by formula (3), (4) or (5) with another ethylenically unsaturated monomer.

5. The cellulose ester film of claim 4, wherein the ethylenically unsaturated monomer is acrylic ester comprising a hydroxy group or an ether bond or methacrylic ester comprising a hydroxy group or an ether bond.

6. The cellulose ester film of claim 1, wherein the ultraviolet absorbent polymer is the copolymer of a repeating unit represented by formula (6) and a monomer unit derived from another ethylenically unsaturated monomer, the content of the repeating unit represented by formula (6) in the copolymer being 1 to 45% by weight.

7. The cellulose ester film of claim 6, wherein the ethylenically unsaturated monomer is acrylic ester comprising a hydroxy group or an ether bond or methacrylic ester comprising a hydroxy group or an ether bond.

8. The cellulose ester film of claim 1, wherein the ultraviolet absorbent polymer is the copolymer of a repeating unit represented by formula (7) and a monomer unit derived from another ethylenically unsaturated monomer, the content of the repeating unit represented by formula (7) in the copolymer being 1 to 55% by weight.

9. The cellulose ester film of claim 8, wherein the ethylenically unsaturated monomer is acrylic ester comprising a hydroxy group or an ether bond or methacrylic ester comprising a hydroxy group or an ether bond.

10. The cellulose ester film of claim 1, wherein the ultraviolet absorbent polymer is the copolymer of a repeating unit represented by formula (19) and a monomer unit derived from another ethylenically unsaturated monomer, the content of the repeating unit represented by formula (19) in the copolymer being 1 to 55% by weight.

11. The cellulose ester film of claim 1, wherein the ultraviolet absorbent polymer is the copolymer of a repeating unit represented by formula (7) and a monomer unit derived from another ethylenically unsaturated monomer, and wherein in formula (7), s and o are not simultaneously zero.

12. The cellulose ester film of claim 11, wherein the content of the repeating unit represented by formula (7) in the copolymer is 1 to 55% by weight.

13. The cellulose ester film of claim 1, wherein the cellulose ester of the cellulose ester film is a lower fatty acid ester of cellulose.

14. The cellulose ester film of claim 1, wherein the compound having an ultraviolet structure represented by formula (3), (4), or (5), or the monomer, from which the repeating unit having an ultraviolet structure represented by formula (1), (2), (6), (7), or (19) is derived, has a molar extinction coefficient at 380 nm of not less than 4000.

15. The cellulose ester film of claim 1, wherein the compound having an ultraviolet structure represented by formula (3), (4), or (5), or the monomer, from which the repeating unit having an ultraviolet structure represented by formula (1), (2), (6), (7), or (19) is derived, has a molar extinction coefficient at 380 nm of not less than 4000, and a ratio of molar extinction coefficient at 380 nm to molar extinction coefficient at 400 nm of not less than 20.

16. The cellulose ester film of claim 1, wherein the ultraviolet absorbent polymer has a weight average molecular weight of 2,000 to 20,000.

17. The cellulose ester film of claim 1, wherein the cellulose ester film is a member for constituting a liquid crystal display.

18. The cellulose ester film of claim 17, wherein the cellulose ester film is a polarizing plate protective film.

19. The cellulose ester film of claim 17, wherein the cellulose ester film is a support for an optical compensation film.

20. The cellulose ester film of claim 1, wherein the thickness of the cellulose ester film is 5 to 200 μm.

21. The cellulose ester film of claim 20, wherein the thickness of the cellulose ester film is 20 to 65 μm.

* * * * *

UNITED STATES PATENT AND TRADEMARK OFFICE
CERTIFICATE OF CORRECTION

PATENT NO. : 6,712,896 B2
DATED : March 30, 2004
INVENTOR(S) : Kaori Ono et al.

It is certified that error appears in the above-identified patent and that said Letters Patent is hereby corrected as shown below:

Column 48,
Line 41, "aryloxcarbonyl" should read -- aryloxycarbonyl --.

Column 49,
Line 1, "alklthio" should read -- alkylthio --.

Signed and Sealed this

Thirtieth Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,712,896 B2
DATED : March 30, 2004
INVENTOR(S) : Kaori Ono et al.

It is certified that error appears in the above-identified patent and that said Letters Patent is hereby corrected as shown below:

Title page,
Item [*] Notice, should read -- under Patent Term Adjustment should be 77 days instead of 21 days. --.

Signed and Sealed this

Eighth Day of November, 2005

JON W. DUDAS
*Director of the United States Patent and Trademark Office*